United States Patent
Joyce et al.

(10) Patent No.: US 10,162,472 B1
(45) Date of Patent: Dec. 25, 2018

(54) SPECIFYING SIZES FOR USER INTERFACE ELEMENTS

(71) Applicant: EMC IP Holding Company LLC, Hopkinton, MA (US)

(72) Inventors: Scott E. Joyce, Foxboro, MA (US); Donald Labaj, Northborough, MA (US); Timothy Cox, Mendon, MA (US); Bruce R. Rabe, Dedham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 114 days.

(21) Appl. No.: 14/034,810

(22) Filed: Sep. 24, 2013

(51) Int. Cl.
*G06F 17/22* (2006.01)
*G06F 3/0481* (2013.01)

(52) U.S. Cl.
CPC ........ *G06F 3/0481* (2013.01); *G06F 17/2247* (2013.01)

(58) Field of Classification Search
None
See application file for complete search history.

(56) References Cited

U.S. PATENT DOCUMENTS

| | | | | |
|---|---|---|---|---|
| 7,681,178 B1* | 3/2010 | George | ............... | G06F 9/4443 717/116 |
| 7,996,780 B1* | 8/2011 | Mitnick | .................. | G06F 8/38 715/760 |
| 8,181,104 B1* | 5/2012 | Helfand | .............. | G06F 17/2247 715/234 |
| 2002/0149618 A1* | 10/2002 | Estrada | ................. | G06Q 10/10 715/760 |
| 2005/0216887 A1* | 9/2005 | Robertson et al. | ........... | 717/113 |
| 2005/0268230 A1* | 12/2005 | Bales | ............................ | 715/530 |
| 2008/0141116 A1* | 6/2008 | Mohan | ......................... | 715/236 |
| 2008/0300863 A1* | 12/2008 | Smith | ................... | G06F 17/289 704/9 |

(Continued)

OTHER PUBLICATIONS

Microsoft "Working with Windows Frames and Dialog Boxes", 2011 (Year: 2011).*

(Continued)

*Primary Examiner* — Jennifer N To
*Assistant Examiner* — Beau D Spratt
(74) *Attorney, Agent, or Firm* — Muirhead and Saturnelli, LLC

(57) ABSTRACT

Techniques for displaying a user interface are described. A first plurality of property files specify property values of user interface elements for a first code entity of an application. The first plurality of property files includes a first property file and a common property file. The common property file specifies a first value for a first property of a first type of user interface element. A second plurality of property files specify property values for a second code entity of the application. The second plurality of property files includes a second property file and the common property file. First processing is performed to render a user interface element of the first type when executing the first code entity. A current value for the first property for the first code entity is determined in accordance with a first lookup chain specifying a prioritized ordering of the first plurality of property files.

20 Claims, 23 Drawing Sheets

(56) References Cited

U.S. PATENT DOCUMENTS

| | | | | |
|---|---|---|---|---|
| 2009/0132232 A1* | 5/2009 | Trefler | .................. | G06Q 10/10 704/2 |
| 2010/0131531 A1* | 5/2010 | Mason et al. | ................. | 707/758 |
| 2010/0153862 A1* | 6/2010 | Schreiber | ........... | G06Q 30/0273 715/760 |
| 2011/0107227 A1* | 5/2011 | Rempell | ............... | G06F 9/4443 715/738 |
| 2012/0254731 A1* | 10/2012 | Peters | ................ | G06F 17/2247 715/236 |

OTHER PUBLICATIONS

U.S. Appl. No. 13/799,890, filed Mar. 13, 2013, Joyce, et al.
U.S. Appl. No. 13/626,323, filed Sep. 25, 2012, Joyce, et al.
U.S. Appl. No. 12/570,716, filed Sep. 30, 2009, Takkallapally, et al.
U.S. Appl. No. 14/035,664, filed Sep. 24, 2013, Joyce, et al.

\* cited by examiner

SPECIFYING SIZES FOR USER INTERFACE ELEMENTS

RELATED APPLICATIONS

This application is related to U.S. application Ser. No. 14/035,664 (pending), filed on even date herewith, INHERITANCE OF PROPERTIES FILES WITH LOCALE CHAIN SUPPORT," Scott E. Joyce et al., which is incorporated by reference herein.

BACKGROUND

Technical Field

This application generally relates to user interfaces and more particularly to controlling characteristics of user interface elements of a user interface.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a data storage system including a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with an application for management of data storage systems, or more generally any application, a user interface may be displayed. Existing applications providing a user interface may control various aspects of user interface (UI) elements, such as visual aspects of buttons, displayed text, and the like, by setting properties of the user interface elements within the application code.

SUMMARY OF THE INVENTION

In accordance with one aspect of the invention is a method for displaying a user interface comprising: providing a first plurality of property files specifying values for properties of user interface elements of the user interface of an application when executing a first code entity of the application, the first plurality of property files including a first property file and a common property file, wherein the common property file specifies a first value for a first property of a first type of user interface element providing a second plurality of property files specifying values for properties of user interface elements of the user interface of the application when executing a second code entity of the application, the second plurality of property files including a second property file and the common property file; executing the first code entity of the application, wherein the executing the first code entity of the application includes performing first processing to render a first user interface element of the first type when displaying the user interface of the application, the first processing comprising: determining a current value for the first property of the first user interface element for use with the first code entity in accordance with a first lookup chain specifying a prioritized ordering of the first plurality of property files; setting the first property of the first user interface element to the current value; and rendering the first user interface element in accordance with the current value. The first lookup chain may specify a prioritized ordering of the first plurality of property files from highest to lowest priority, and the method may further comprise determining a set of one or more of first plurality of property files each specifying a value for the first property of the first type of user interface element; and determining the current value for the first property of the first user interface element using the set of one or more of the first plurality of property files, wherein the current value is specified in a first of the property files in the set having the highest relative priority of all property files in the set in accordance with the first lookup chain. The first plurality of property files may be processed in order from the highest to the lowest priority of the prioritized ordering of the first lookup chain. The first type of user interface element may be any of a window, a menu, a menu bar, a menu item, a text box, a button, a navigation section including one or more hyperlinks, a hyperlink, a table, a drop-down list, a list box, a check box, a dialog box, a wizard, and a combo box. The first property of the first type of user interface element may affect any of a text size, a numeric value denoting an intensity of a color, a numeric value denoting a mixture or shading of one or more colors, a physical dimension, a height, a width, and a location or placement of the first type of user interface element in connection with displaying the user interface. It may be that the first property file does not specify a value for the first property of the first type of user interface element and the common property file specifies the current value for the first property of the first type of user interface element, and the second property file also does not specify a value for the first property where subsequently modifying the current value in the common property file to an updated value results in the updated value being used when executing the first code entity and the second code entity. The first property file may specify a first value for the first property of the first type of user interface element and the common property file may specify a second value for the first property of the first type of user interface element, and wherein the determining a current value for the first property of the first user interface element for use with the first code entity in accordance with the first lookup chain may determine the first value as the current value for the first property of the first type of user interface element. The method may include executing the second code entity of the application, wherein the executing the second code entity of the application may include performing second processing to render a second user interface element of the first type when displaying the user interface of the application. The second processing may include determining a second current value for the first property of the second user interface element for use with the second code entity in accordance with a second lookup chain specifying a prioritized ordering of the second plurality of property files; setting the first property of the second user interface element to the second current value; and rendering the second user interface element in accordance with the second current value. The second lookup chain may specify a prioritized ordering of the second plurality of property files from highest to lowest priority, and the method may further comprise determining a set of one or more of second plurality of property files each specifying a value for the first property of the first type of user interface element; and determining the second current value for the first property of the second user interface element using the set of one or more of the second plurality of property files, wherein the second current value is specified in a first of the property files in the set having the highest relative priority of all property files in the set in accordance with the second lookup chain. The second plurality of property files may be processed in order from the highest to the lowest priority of the prioritized ordering of the second lookup chain. The second property file may not specify a value for the first property of the first type of user interface element and the common property file may specify the second current value for the first property of the first type of user interface element. The second property file may specify a first value for the first property of the first type of user interface element and the common property file may specify a second value for the first property of the first type of user interface element, and wherein the determining a current value for the first property of the second user interface element for use with the second code entity in accordance with the second lookup chain may determine the first value as the second current value for the first property of the second user interface element. The first property file may be a property file specifically for use with the first code entity and may specify property values for user interface elements customized for use with the first code entity related to a first combination of factors including one or more of a spoken language, a country, and a third party, and wherein the second property file may be a property file specifically for use with the second code entity and may specify property values for user interface elements customized for use with the second code entity related to the first combination of factors, and wherein the common property file may be a property file that specifies property values for user interface elements that are customized for the first combination of factors. The first plurality of property files may include a third property file customized for use with the first code entity and may include customization of property values related to a second combination of factors including one or more of another spoken language, another country and another third party. A second common property file may be included in both the first plurality of property files and the second plurality of property files. The second common property file may specify property values for user interface elements that are customized for a different combination of factors including one or more of a second spoken language different from the spoken language, a second country different from the country, and a second third party different from the third party.

In accordance with another aspect of the invention is a method for displaying a user interface comprising: providing a first set of property files specifying values for properties of user interface elements of the user interface of an application when executing any of a first dialog and a first wizard of the application, the first set of property files including a common property file and a first property file, the common property file specifying property values for a first particular combination of factors including any one or more of a first spoken language, a first country and a third party provider or distributor, the first property file including property values for the first particular combination of factors further customized for use with the any of the first dialog and the first wizard, wherein the common property file specifies a first value for a first property, wherein the first property is a size dimension of all windows displayed when executing any of a dialog and wizard of the application; providing a second set of property files specifying values for properties of user interface elements of the user interface of an application when executing any of a second dialog and a second wizard of the application, the second set of property files including the common property file and a second property file specifying property values for the first particular combination of factors customized for use with the any of the second dialog and the second wizard; executing the any of the first dialog and the first wizard of the application in accordance with the first particular combination of factors, wherein the executing the any of the first dialog and the first wizard includes performing first processing to render a first window, the first processing comprising: determining a first final value for the first property in accordance with a first lookup chain specifying a prioritized ordering of the first set of property files, wherein if the first property file does not specify a value for the first property, the first value of the common property file is used as the first final value, and wherein if the first property file specifies a second value for the first property, the second value of the first property file is used as the first final value; setting the first property to the first final value; and rendering the first window in accordance with the first final value; and executing the any of the second dialog and the second wizard of the application in accordance with the first particular combination of factors, wherein the executing the any of the second dialog and the second wizard includes performing second processing to render a second window, the second processing comprising: determining a second final value for the first property in accordance with a second lookup chain specifying a prioritized ordering of the second set of property files, wherein if the second property file does not specify a value for the first property, the first value of the common property file is used as the second final value, and wherein if the second property file specifies a third value for the first property, the third value of the first property file is used as the second final value; setting the first property to the second final value; and rendering the second window in accordance with the second final value. The step of executing may be performed at a first point in time, and the method may further comprise: modifying the first value of the common property file to an updated value for the first property; and subsequent to performing the modifying, performing other processing including executing, at a second point in time subsequent to the first point in time, the any of the first dialog and the first wizard and executing the any of the second dialog and the second wizard, and wherein if the first property file does not specify a value for the first property, the updated value of the common property file is used as the first property when executing the any of the first dialog and the first wizard at the second point in time, and wherein if the second property file does not specify a value for the first property, the updated value of the common property file is used as the first property when executing the any of the second dialog and the second wizard at the second point in time.

In accordance with another aspect of the invention is a computer readable medium comprising code stored thereon for displaying a user interface, the computer readable medium comprising code stored thereon for: providing a first plurality of property files specifying values for properties of user interface elements of the user interface of an application when executing a first code entity of the application, the first plurality of property files including a first property file and a common property file, wherein the common property file specifies a first value for a first property of a first type of user interface element providing a second plurality of property files specifying values for properties of user interface elements of the user interface of the application when executing a second code entity of the application, the second plurality of property files including a second property file and the common property file; executing the first code entity of the application, wherein the executing the first code entity of the application includes performing first processing to render a first user interface element of the first type when displaying the user interface of the application, the first processing comprising: determining a current value for the first property of the first user interface element for use with the first code entity in accordance with a first lookup chain specifying a prioritized ordering of the first plurality of property files; setting the first property of the first user interface element to the current value; and rendering the first user interface element in accordance with the current value. The first lookup chain may specify a prioritized ordering of the first plurality of property files from highest to lowest priority, and the computer readable medium may further comprise code for: determining a set of one or more of first plurality of property files each specifying a value for the first property of the first type of user interface element; and determining the current value for the first property of the first user interface element using the set of one or more of the first plurality of property files, wherein the current value is specified in a first of the property files in the set having the highest relative priority of all property files in the set in accordance with the first lookup chain. The first plurality of property files may be processed in order from the highest to the lowest priority of the prioritized ordering of the first lookup chain and wherein said first type of user interface element may be any of a window, a menu, a menu bar, a menu item, a text box, a button, a navigation section including one or more hyperlinks, a hyperlink, a table, a drop-down list, a list box, a check box, a dialog box, a wizard, and a combo box.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
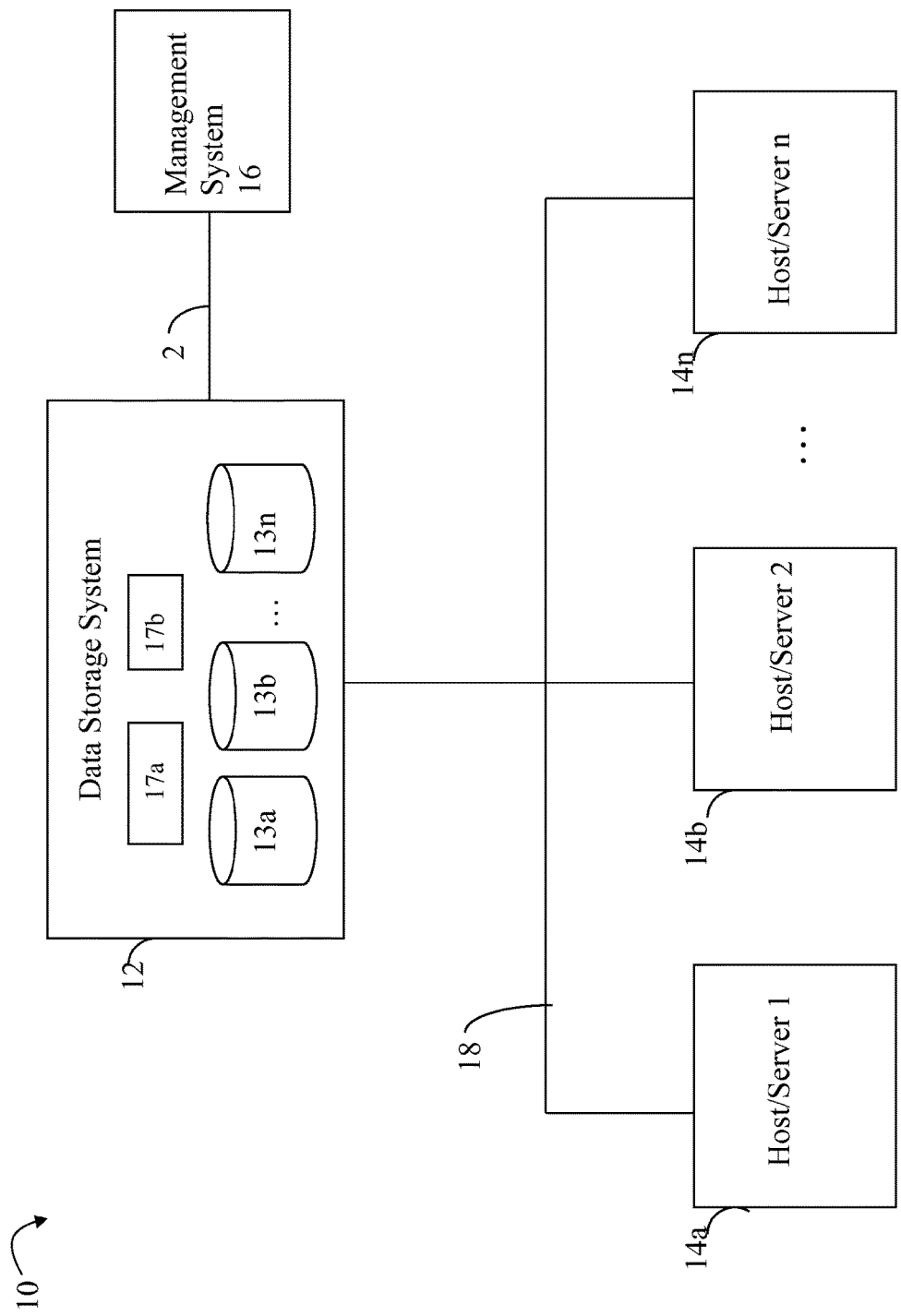
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems and management system 16 may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two service processors or compute processing units. Techniques herein may be more generally use in connection with any one or more data storage system each including a different number of service processors than as illustrated herein. The data storage system 12 may be a data storage array, such as a VNX™ data storage array by EMC Corporation of Hopkinton, Mass., including a plurality of data storage devices 13a-13n and two service or storage processors 17a, 17b. The service processors 17a, 17b may be computer processing units included in the data storage system for processing requests and commands. In connection with performing techniques herein, an embodiment of the data storage system may include multiple service processors including more than two service processors as described. The VNX™ data storage system mentioned above may include two service processors 17a, 17b for performing processing in connection with servicing requests. Additionally, the two service processors 17a, 17b may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
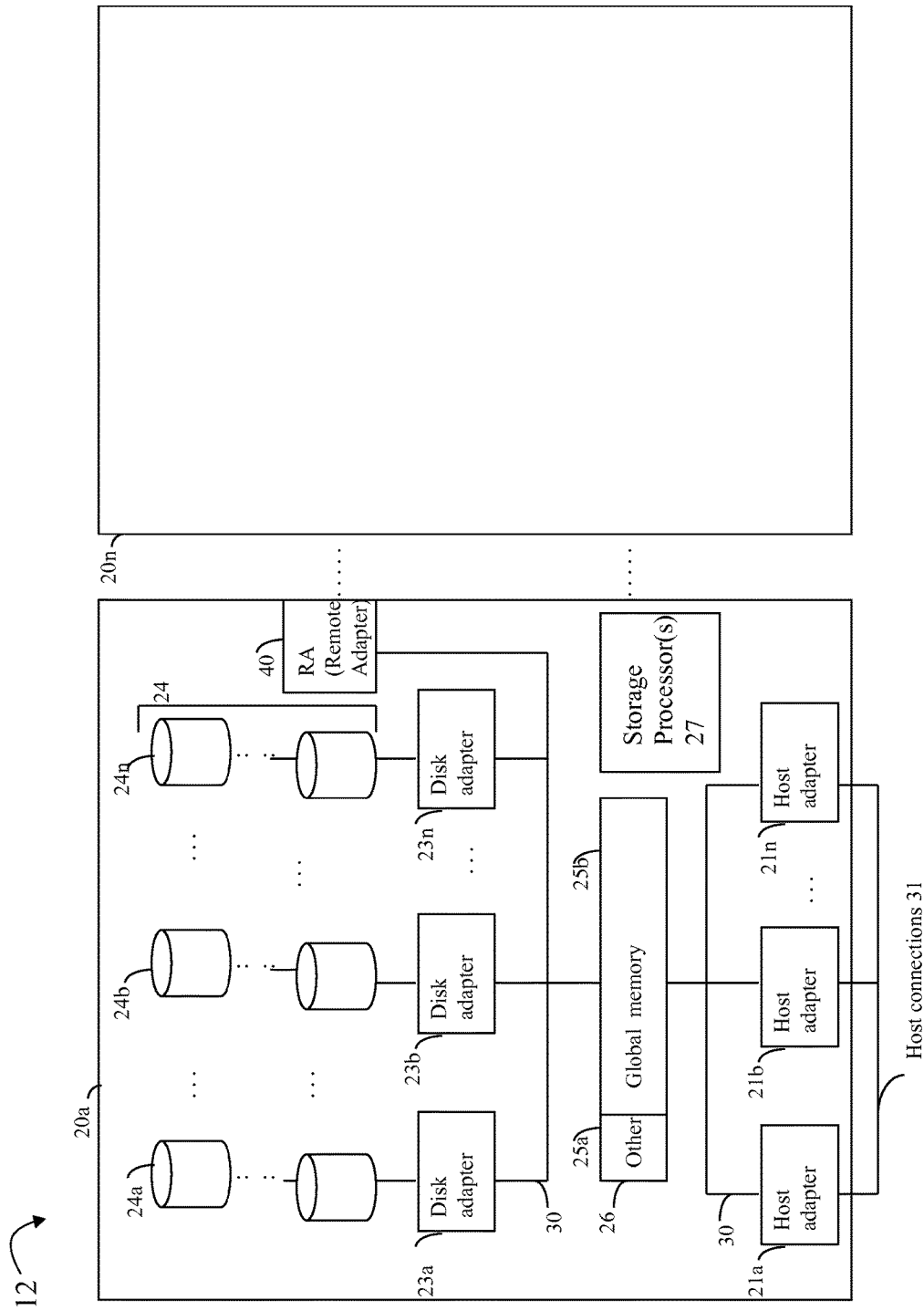
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the VNX™ data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

Also shown in the storage system 20a is an RA or remote adapter 40. The RA may be hardware including a processor used to facilitate communication between data storage systems, such as between two of the same or different types of data storage systems.

A configuration of a data storage system may be described by data storage configuration information. The data storage configuration information may describe various entities, attributes, and the like, about how the physical storage systems and devices are configured such as by a manager or system administrator. For example, the data storage configuration information may identify and describe LUNs, file systems, RAID groups, and the like, as may be formed using the physical data storage of the data storage system. With reference back to FIG. 1 in one embodiment, management software may be executing on the management system 16 where the user may be issuing requests in connection with reading and/or writing data storage configuration information that may be stored on physical storage device of the data storage system 12. More generally, the management system 16 may be referred to as a client issuing requests to the data storage system 12 which acts as a server to service the client requests (e.g., read and write requests) for data storage configuration information.

In general, a storage area network (SAN) may be characterized as a collection of data storage systems that are networked together via a switching fabric to a number of host computer systems operating as servers such as illustrated in FIG. 1.

Data storage management applications may include a graphical user interface (GUI) that enables a network manager to graphically manage, control, and configure various types of hardware and software resources associated with a corresponding managed storage area network and its data storage systems. The management application may execute, for example, on the management system 16 of FIG. 1. The management application may generate a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen or other display, a storage administrator is able to manage hardware and software entities such as file systems, databases, storage devices, volumes, peripherals, network data communications devices, etc., associated with the storage area network. Consequently, the storage management system 16 and associated management software enables a storage administrator (a person responsible for managing the storage network) to manage the storage area network and its resources.

One example of this kind of GUI includes a screen presentation that may include toolbars with accompanying menus and menu items as well as displays such as graphs, tables, maps or trees. The management application providing the GUI may be written in any suitable language such as JavaScript, Flex, and the like.

Described in following paragraphs are techniques that may be used in connection with centralized support for user application controls such as user interface elements of a displayed user interface. Such techniques may be used, for example, in connection with the management and control of user interface characteristics in displaying data storage system information. Although examples and references herein may be made with respect to a GUI of an application for data storage management, more generally, the techniques herein may be used in connection with any suitable user interface (UI) for any application. Using techniques described below, various characteristics and aspects (also referred to herein as properties) of UI elements, such as related to the "look and feel" of a GUI, may be controlled and customized. Look and feel may include aspects of UI elements related to the look or visual appearance of the elements and also the way the user interacts with the UI element (the feel). For example, enabling, disabling or hiding a UI element such as a text box, radio button, menu, and the like, may be characterized in one aspect as affecting the way a user interacts with the UI element. It should be noted that a UI element that a user interacts with may also be known as a control or widget. Aspects related to the look, such as various visual aspects of a UI element, may include, for example, colors, shapes, layout, fonts, font sizes, whether text is italicized, bolded, the image displayed in connection with an icon associated with a UI element, and the like.

In accordance with techniques described herein, an embodiment may use one or more property files which provide for further specifying characteristics of UI elements. Such property files may be included in a defined hierarchy or lookup chain specifying an ordered list in which the property files are read and processed by a look-up service. The files may specify properties of UI elements denoting particular settings of the properties defining characteristics of the UI elements, such as related to the look and feel of the UI elements. The order in which the property files are read affects the order or precedence in which a property obtains its value setting whereby a same property may have a first value in a first property file and the same property may have second value in a second property file. If the first property file is processed in accordance with the look-up chain prior to the second property file, the property may be set to a final value of the second value whereby the subsequent setting of the property to the second value in the second property file overrides the previous first value as specified in the first property file. The property files may be processed at runtime when executing the application thereby provided a means for modifying and customizing UI element characteristics without modifying code of the application. A UI element may be created with a default set of properties and associated values by the application within the application code. When executing the application and processing a property file, any property having a value in a property file may be used to customize or override the default value for the property as specified in the application code, or a previously processed property file. If the property is not provided with an updated value in a property file, the property may retain its default value as may be provided in the application code. In this manner, when there are multiple property files, a layering approach may be provided for customization of property values based on the order in which the multiple property files are processed in the look-up chain. No property file may be required whereby the properties have values as may be specified in the application code. Default values may also be specified in a particular property file. If a property file is specified, the property file may optionally include values for any number of properties which the application permits to be modified using the property file. In the event that multiple property files are processed based on the look-up chain, any property specified as having multiple values in multiple files may retain the value setting of the lastly processed property file in the chain. This is described in more detail in following paragraphs.

Providing for customization of UI elements has many uses, some examples of which are described herein. For example, a vendor may build and release into market an application that is then purchased for resale and/or redistribution such as by another third party. The third party may purchase the application produced by the vendor and the third party may incorporate or bundle the application with the third party's own software and/or hardware. The third party may want to customize UI elements of the application to have a particular look and feel consistent with branding for third party products whereby products sold or distributed by the third party (including the application of the vendor being bundled by the third party) may have a particular look and feel. In this manner, the third party may brand the application for its own purpose such as, for example, to reflect the third party brand by changing displayed text so as to identify the third party, changing displayed icons denoting the third party brand, and the like. Additionally, the third party may want to disable (e.g., such as through greying out a displayed UI element) or otherwise hide (e.g., whereby the UI element is not visible on the UI displayed) particular UI elements, such as buttons, menus, and the like, whereby the default of such UI elements may otherwise be enabled by the application code by default. Whether a particular UI element is enabled, disabled or hidden may depend on the particular functionality provided by the third party. Such customization of aspects of UI elements may be used in connection with one or more third parties in the sale and distribution chain of the application alone, or in combination with, providing customization of aspects of UI elements due to different human languages and dialects as may vary with geographical location (e.g., country or region in a country). This is described in more detail in following paragraphs.

Although exemplary uses herein may be made with reference to particular UI elements, it will be appreciated that techniques herein may be used in connection with any suitable UI element of an interface. UI elements may include, for example, a menu, a menu bar, a menu item, a text box, a button (e.g., radio button, cycle button), a wizard, a navigation section including one or more hyperlinks, a table, a drop-down list, a list box, a check box, a dialog box, and a combo box. Menus allow the user to execute commands by selecting from a list of choices. Menu options are selected, for example, with a mouse or other pointing device within a GUI. A keyboard may also be used. A menu may be, for example, a pull-down menu displayed in response to a user selection. A menu bar may be displayed horizontally across the top of the screen and/or along the tops of some or all windows. A software wizard is a UI type that presents a user with a sequence of dialog boxes that lead the user through a series of well-defined steps. A text box may be a box in which to enter text or numbers. A hyperlink may be displayed as text with some visual indicator (such as underlining and/or color) indicating that selecting the link will result in linking or displaying another screen or page. Properties of a hyperlink may relate to whether the hyperlink is enabled, disabled or hidden. If enabled, the particular path or location identifying a website or the web page may be displayed in response to selection of the hyperlink. A drop-down list may be a list of items from which to select. The list normally only displays items when a special button or indicator is selected. A list box allows a user to select one or more items from a list contained within a static, multiple line text box. A combo-box may be a combination of a drop-down list or list box and a single-line textbox, allowing the user to either type a value directly into the control or choose from the list of existing options. A check box indicates an "on" or "off" state via a check mark ☑ or a cross ☒. A radio butting is similar to a check-box, except that only one item in a group can be selected. Its name comes from the mechanical push-button group on a car radio receiver. Selecting a new item from the group's buttons also deselects the previously selected button. A cycle button is a type of button that cycles its content through two or more values, thus enabling selection of one from a group of items. A table may also be referred to as a grid in which numbers and/or text may be displayed in rows and columns. The foregoing are some examples of UI elements that may be supported in an embodiment in accordance with techniques herein. A UI element may have a property identifying a location of an image or other file used to display an icon associated with the UI element. An icon is a small picture. Icons may be useful, for example, to display an image in connection with branding such as related to a particular vendor or service. A same image may also be associated with a common operation, file type, and the like. For example, a scissors icon may represent a menu option to cut whereby such an icon may be commonly used across many applications from one or more vendors, third parties, and the like, which may sell different applications.

Using techniques herein, UI content (e.g., strings), settings of style-based properties and other properties related to UI controls may be included in one or more property files to provide customization for any suitable purpose including, for example, to provide customization by a vendor of an application, provide customization of the UI by a third party reselling or redistributing the application of another, provide customization for aspects of UI elements such as related to language differences, and the like. An embodiment using techniques herein may provide for such customization of an application's UI after an application has been built and distributed without requiring changes to the application code to provide customizations. Processing may be performed to automatically and dynamically perform a lookup of the correct property files for human language translation as well as for customization by third parties reselling and/or redistributing an application provided by another original application vendor. The one or more property files provide for a generic and centralized ability to enable/disable and/or hide UI controls throughout the application. The one or more property files may include an application-wide unique control identifier to uniquely identify a particular UI element. For such a UI element, the property file may also identify a particular property and a value to which the property is set. This property file is inserted into the lookup procedure and process as described in more detail herein. If there is no entry for a UI element or property of a UI element in the property file, then that UI element is processed/displayed without modification from any default specified by the application code. Techniques herein may be used to generically support the ability to disable or hide any/all UI elements such as by setting the property of a particular UI element to a value denoting the selected state of enabled, disabled or hidden. Generally, the techniques herein may be used to specify a value or setting of any property of a UI element. The properties may include those as described above related to displayed text, display state (e.g., enabled/disable/hide) of a UI element, an ordering of displayed elements or text (left to right, right to left (e.g., may be language dependent or vary with whether a particular language has its text read from left to right or right to left), ordering of menu items such as displayed in pull-down menu, size or physical dimensions of a UI element (e.g., width, height), location/position of button on UI display (e.g., may be an absolute or relative location as displayed), sort ordering of buttons or UI element on screen, ordering or position of displayed text in table, listing of UI elements, and the like.

Figure 3:
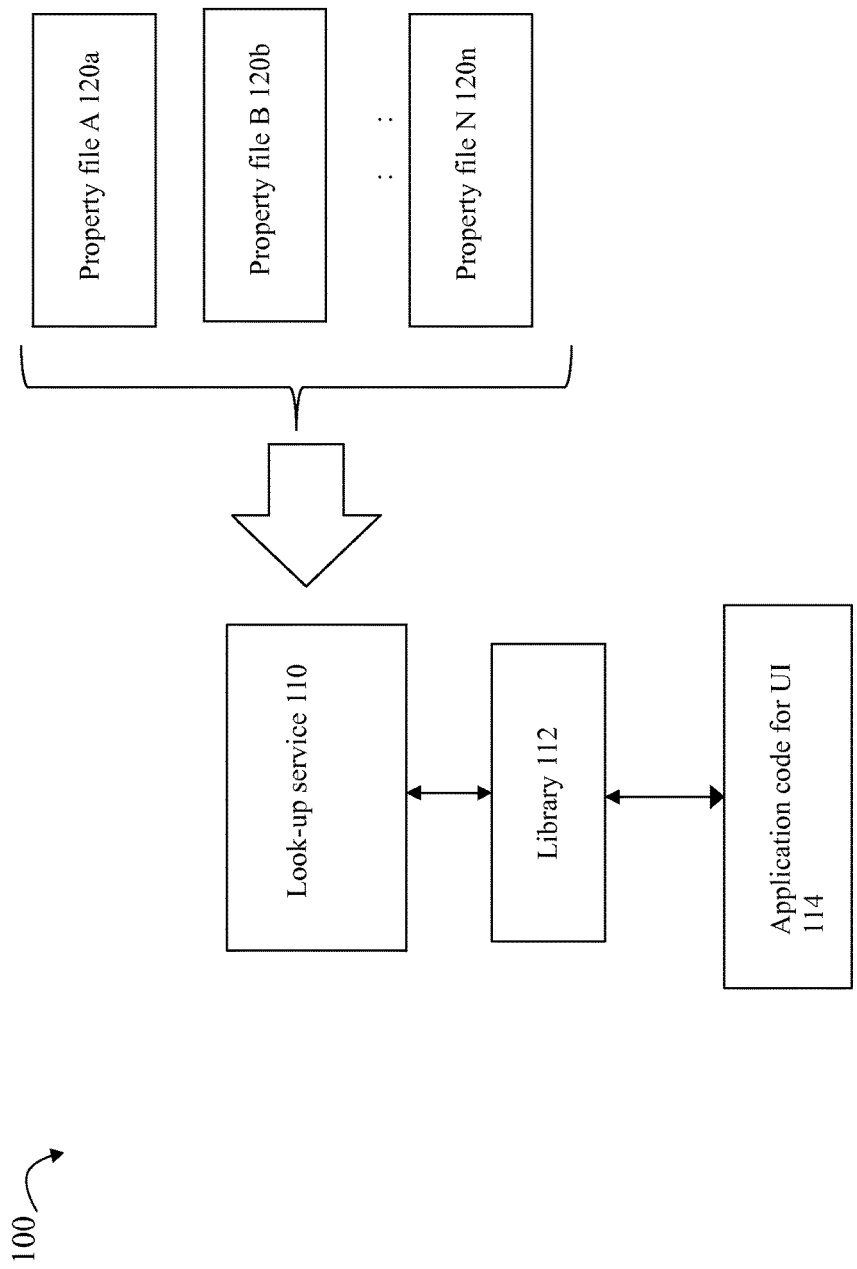
FIGS. 3 and 12 are examples of components that may be included in embodiments in accordance with techniques herein.

Referring to FIG. 3, shown is an example of components that may be included in an embodiment in accordance with techniques herein. The components of the example 100 may be included a management system 16 for an application and its UI used in connection with management of data storage system(s). The example 100 includes application code 114 which includes code for rendering a UI, a library 112, and a look-up service 110. The application code 114 may be linked against a library 112 of routines or methods which are invoked in connection with displaying UI elements of a GUI of the application code 114. In turn, code of the library 112 communicates with the look-up service 110 which is a runtime look-up service that reads and processes property files 120a-120n based on a look-up chain of property files providing a predefined or predetermined ordering in which the property files are processed by the look-up service 110. At runtime, information may be returned from 110 to 112 and then from 112 to 114 as illustrated.

The property files 120a-120n may include content and, more generally, values for properties affecting the manner in which UI elements of a UI are displayed and operate. The content may include, for example, values for strings, icons such as images, and the like. When there is a desire to possibly vary such content, an embodiment may partition the content and other property settings of the UI elements from other code that may be used to render the UI. Furthermore, an embodiment may provide support for multiple property files 120a-120n to be used with the UI. For example, the UI may include multi-lingual support providing for customized language-dependent UI elements depending on the particular language of the country or locality. In this manner, support in the UI may be included for multiple different language by having a different property file for each particular language-dependent UI elements such as displayed text in a particular language. In this case, there may be a defined look-up chain or prioritized list of property files that may exist for use in connection with defining elements and values displayed in connection with a UI for the application Each of the properties files may have a name formed from predetermined naming conventions. For example, a property file may have a name formed based on the following pattern:

APP_XX_YY.PROP whereby APP denotes the application, XX is a two letter coding denoting a particular language and YY is a two letter coding denoting a particular country. To further illustrate, there may be default or first language property file for English as used in the US named APP_EN_US.PROP which includes UI language dependent content elements specified in English. Similarly, the name of a property file including French content or UI dependent language elements for use in countries such as France may be APP_FR_FR.PROP based on such predetermined naming conventions.

In connection with the foregoing naming convention, a defined hierarchy or order of precedence may be defined for the different possible property file names indicating the order in which content, such as a value for a string or image for an icon, is determined by the UI. For example, there may be a first property file such as APP_EN_US.PROP. The look-up chain may provide for optionally specifying and using one or more other property files which may override values and definitions of the foregoing first file. The above-mentioned French property file of APP_FR_FR.PROP may be an example of an optional property file of the defined look-up chain whereby any values specified in the French file may override or replace values of the English file (e.g., first property file). Code of the UI may always look for and utilize the default English property file. Additionally, for example, if the UI is executing in a particular country or based on particular language or country configurations settings for the UI, processing may also form the name of a second property file, such as the French property file, based on the predetermined file naming conventions for the desired language and country. Processing may be performed such as by the look-up service 110 to attempt to locate the second property file in one or more expected or known locations (e.g., particular devices and/or directories). If the second property file exists, the UI may use the combination of values of both the first property file and the second property file in defining elements of the UI. If there is any conflict between a value in the first and second property files, the value specified in the second property file overrides that specified in the first property file. For example, the first property file may specify a value for a string or tag in English displayed in the UI such as for a label in a menu or menu item, content of a button, and the like. The second property file may also specify a value for the same UI element property but in French. If the second property file exists, the UI uses the property value for the UI element of the second property file. Otherwise, if the second property file does not exist, the UI uses the property value of the UI element value of the first property file. It should be noted that if there is no property files or any one or more property files are empty, the UI elements may retain any default settings for the property values as specified within the application code 114 and/or library 112.

It should be noted that for simplicity of illustration, the above-noted naming convention for a property file may provide support for a single lookup chain of property files per application. As will be appreciated by those skilled in the art, an embodiment may provide support for having multiple independent lookup chains of property files per application using a different suitable naming convention. For example, the following may denote a property file naming convention pattern for an application for multiple lookup chains of property files:

APP_CHAINP_XX_YY.PROP where APP, XX and YY are as described above and elsewhere herein and CHAINP denotes a particular lookup chain of property files whereby each lookup chain may be uniquely associated with a different "P" as included in "CHAINP" (e.g., P may be an integer uniquely identifying a particular lookup chain of property files where each chain has its own possible variant of property files for language variation and customizations, distribution and/or sales chain customizations as described elsewhere herein, and the like). More generally, a predefined pattern denoting the property file names may or may not include a portion denoting the application.

In connection with multiple independent lookup chains per application, consider the following example. An application may include multiple code entities such as multiple dialogues, wizards, and the like each requiring its own customized property values. By providing multiple independent lookup chains for a single application, a portion of the property files may be processed in a different look-up chain for each code entity of the application. For example, the application APP1 may include dialogues D1 and D2. Property files processed in connection with a first lookup chain to determine customized property values for use with D1 of APP1 may be those property files having the form APP1_CHAIN1_XX_YY.PROP (wherein a value of P=1 as used with CHAINP denotes D1). Additionally, property files processed in connection with a second lookup chain to determine customized property values for use with D2 of APP1 may be those property files having the form APP1_CHAIN2_XX_YY.PROP (wherein a value of P=2 as used with CHAINP denotes D2).

In addition to defining a look-up chain of predetermined property files providing for language and/or geographic customizations, the look-up chain may also include one or more property files providing for UI element customization by one or more entities of the distribution and/or sales chain of the application. For example, as described elsewhere herein, a vendor may be a first vendor that builds and releases the application 114. The application 114 may be purchased by a second vendor which bundles the application with other hardware and/or software which is then sold to a customer or perhaps yet another third vendor. The look-up chain may allow for each of the first vendor, second vendor, and any other vendor in the distribution or sales chain of the application to provide one or more property files customizing UI elements. For example, the look-up chain may include a predetermined sequence of property file names whereby the first vendor and the second vendor may optionally provide a property file for each possible geographic location or language variant. In this manner, the look-up service 110 may always look for each file in the predetermined sequence of possible property files.

As noted above, APP_XX_YY.PROP may denote that naming convention for the property file(s) provided by the first vendor. Each additional vendor (denoted "Vn" where "n" is an integer denoting the next vendor in the sales or distribution chain) in the look-up chain may provide property files of the general form APP_XX_YY_Vn.PROP. To further illustrate for the example where there are the above-mentioned first and second vendors, assume that each such vendor may provide for UI customization for two countries—the US and for France. The look-up chain may be configured to include four files based on the above-noted file naming convention:

1. APP_EN_US_V1.PROP /* denoting the first vendor's US customization property file */
2. APP_EN_US_V2.PROP /* denoting the second vendor's US customization property file */
3. APP_FR_FR_V1.PROP /* denoting the first vendor's French customization property file */
4. APP_FR_FR_V2.PROP /* denoting the second vendor's French customization property file*/

Such a look-up chain of property files may be represented by property files 120a-120n whereby the look-up chain of property files is traversed in the order from 1 through 4 at runtime by the look-up service 110. In this example, if the application is used in the US, the look-up service may not look for any French language property files (3 and 4 above) and only look for English language property files 1 and 2 above. If the application is used in France, the look-up service may utilize a look-up chain including all 4 files and attempt to locate all four property files (1-4 above). In this manner, any property values included in the fourth property file APP_FR_FR_V2.PROP by the second vendor may override any other UI customizations provided by the first vendor and may also override any other UI customizations provided for by the US or English variations of either vendor.

In connection with the foregoing example, the look-up chain may represent a prioritized ordering of property files, such as files 1-4, whereby if two different property files both specify a different value for the same property, the value assigned to the property in the file that occurs the latest in the lookup chain is the final resulting property value. Thus, the value assigned to the property in the latest occurring file in the look-up chain overrides any previous value assignments for the same property. In this manner, the look-up chain may define a prioritized ordering of multiple property files whereby a second file that occurs after a first file in the ordering may have a higher priority in that any values for properties in the second file may override values for the same properties occurring in the first file. The foregoing describes a processing order in which the property files may be traversed in terms of increasing priority so that all property files are traversed. Rather than perform processing whereby all property files are traversed in the look-up chain in the foregoing increasing prioritized ordering, an embodiment may alternatively process the property files in the reverse ordering (e.g., from highest to lowest priority). If a value for a property is determined by traversing the property files in order from highest to lowest priority, processing may not require traversing all property files in that processing performed to determine a value for a particular property may stop as soon as a first property value assignment for the particular property has been located in one of the property files. It should be noted that this property file processing order from highest to lowest priority may be generally performed in connection with any examples as described herein although processing may also be described in connection with processing property files from the lowest to the highest priority.

In connection with the foregoing example, it should be noted that only a single language is associated with each of the countries of France and the US for each of the vendors. However, based on the predetermined property file naming convention described above, an embodiment may provide for multiple language customizations for each vendor through multiple property files for a single country. For example, for the US, English and Spanish UI customizations may be provided by the first vendor through two different property files, respectively, APP_US_EN.PROP (English UI property value customizations) and APP_US_SP.PROP (Spanish UI property value customizations).

It should be noted that any number of possible property files may be included in the look-up chain for any number of vendors, or more generally, entities, in the sales or distribution chain of the application. Additionally, each such entity in the distribution or sales chain may be allowed to provide one or more property files for use such as based on language or geographic customizations as well as for other purposes.

Referring back to FIG. 3, the look-up service 110 may provide property value information at runtime to the library 112 which is, in turn, provided to the application code's UI when rendering a page for display. The code 114 may call a method or routine in the library 112 which, in turn, invokes the look-up service 110 at runtime to determine properties for particular UI elements being displayed for the application's UI. The look-up service 110 may use the information obtained from the one or more property files 120a-120n. For example, the look-up service 110 may attempt to locate and read the contents of the four property files as noted above. The service 110 may process the property files based on the predetermined ordering of the look-up chain and may determine a resulting property value for any property defined in one or more property files.

Each UI element may be uniquely identified by a unique identifier (ID) associated with the particular UI element. A particular property may be referenced for a UI element as ID. property. In some embodiments, the property file may specify or assign a value to a property using name-value pairing such as ID.Property=value. When the application code inquires or queries regarding different property values from the library and the look-up service, the APIs (application programming interfaces) defined between 114 and 112 and/or 112 and 110 may allow an inquiry regarding all properties of a particular UI element by specifying just the ID without identifying any particular property. The API may also return a value for one or more particular properties by allowing requests for particular instances of ID.property1, ID.property2, and the like. Additionally, property values returned may be in any suitable form based on the defined API. The property values returned for an ID may be, for example, in the form of a string of all properties having a value obtained from the one or more property files.

It should be noted that if a property is not specified in one of the property files, a null may be returned for that property from the look-up service 110 to the library 112 meaning that there is no change to any default value as may be specified by the application code 114 and/or library 112. In this manner, an embodiment may have the application code 114 and/or library 112 provide a default value in the case where no value for a property is specified in one of the property files. As a variation, consider a second option whereby if no property values is specified for a given property in one of the property files, the look-up service 110 may provide a default value (e.g., from another source such as a separate default file, as may be encoded in the logic of the look-up service code, and the like). As another third option, an embodiment may always include at least one property file which may have the lowest or least priority in the look-up chain which provides default property values. In this manner with the third option, default property values may be provided using a default property file having the lowest or least priority in the look-up chain and any second property file that specifies a value for a same property also included in the default property file overrides the value of the default property file (e.g., all other property files have a higher priority in the look-up chain than the default property file).

As a further illustration, an application developer may create a dialog or other code 114 which is executed in connection with an application GUI. The code 114 may include UI elements defined in a base class by the library 112. The developer code 114 may use such UI elements in connection with creating and rendering a GUI. For example, a UI element included in a class of the library 112 may be a button, EMC_button, having a particular ID which is initialized when rendering the UI. An instance of EMC_Button may be referenced in the developer code 114 as a UI element. The library 112 may be linked and loaded for use with the developer code 114. The developer code 114 may create an instance of an object of the class EMC_Button for use in the developer's UI. Changes affecting properties of such UI elements utilized by the developer code (application) may be made using one or more property files. As part of initialization of the UI element of class EMC_Button, a method or routine "init" of the library 112 supplied for use by the developer code 114 may be invoked to retrieve the properties of the UI element prior to rendering the instance of the UI element, EMC_Button, on a display. The library init routine or method may invoke the lookup service to obtain one or more property values for the UI element. The following may represent a pseudo-code like representation of code included in the library 112 for processing performed in connection with the above-mentioned init method or routine which may be implicitly invoked as part of initializing a UI element displayed by the application or developer code 114. The following provides for returning a single property value of size but may be generalized to return multiple different property values from the look-up service
init ID
{
   string.size=lookupservice.get_property(ID+"size");  /*
     another method which calls lookup service where "size" is the property name **/
   if string.size !=NULL
   {
     set ID.size=size;
   }
   else
   {
     set ID.size=default_size;
   }
   return (string.size)
}

The developer or application code may create an instance of an object of the class EMC_Button for use in the developer's UI. Value changes affecting properties of such UI elements like instances of EMC_Button utilized by the developer code (application) may be made using the one or more property files 120*a-n* processed at runtime. In this manner, a vendor may ship an application with a UI 114 which uses the library 112. A third party may be allowed to further customize UI elements of the application through the use of a customized third party supplied property file of the look-up chain since the property file may be read in by the lookup service at runtime when executing the application. In this manner, changes (such as customized by the third party) may be made to the displayed UI elements of the application after the application is distributed by the original vendor without making further changes to the application code.

It should be noted in the above snippet for init, the library routine or method init may specify a default value if there is no value specified in any of the property files. However, it should be noted that other code included in the application may also provide or specify such a default value should no other value be specified in any of the property files.

What will now be described in following paragraphs are additional exemplary uses of the techniques herein using property files for UI customization as may be performed by an embodiment.

Figure 4:
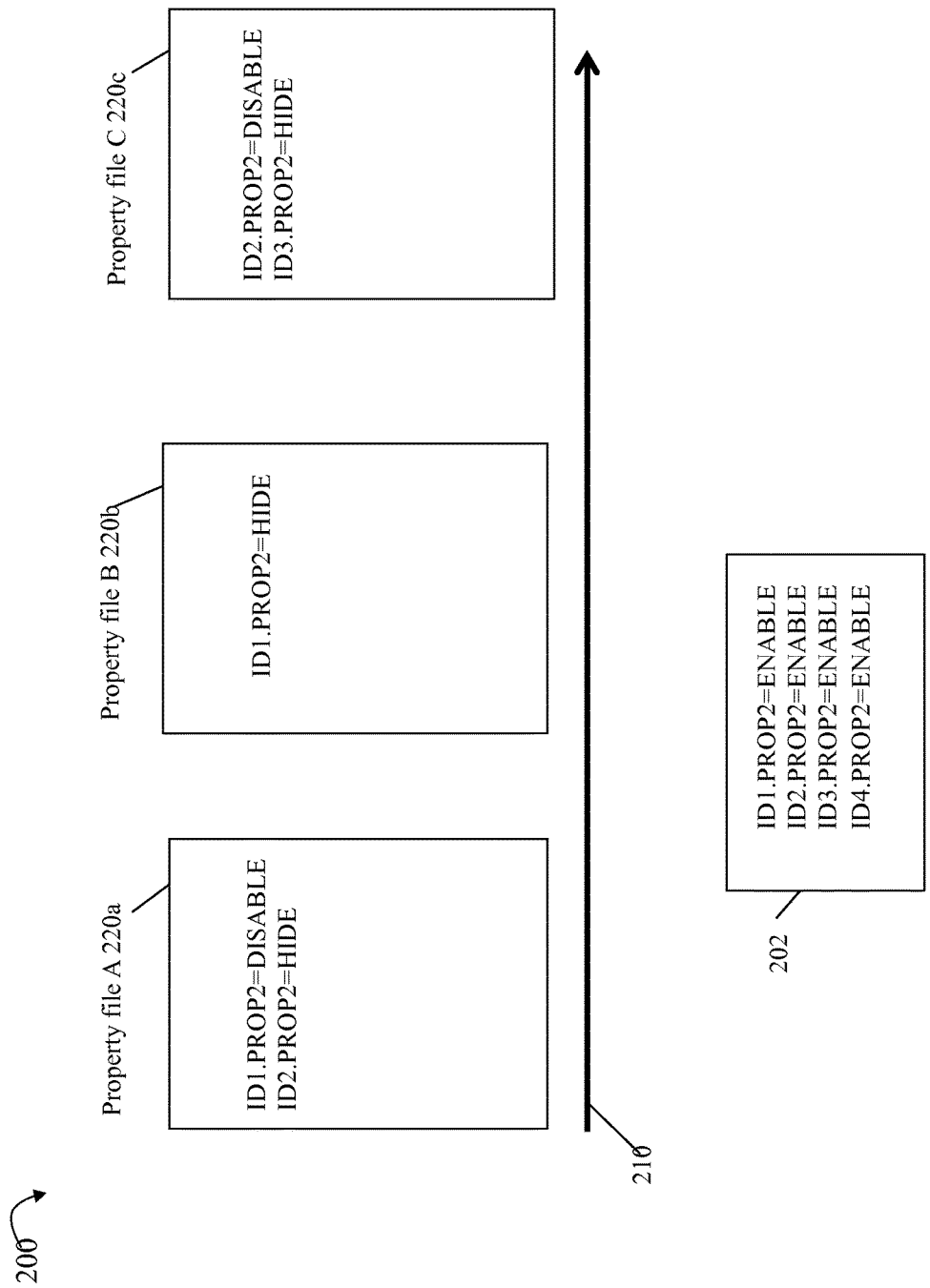
FIGS. 4-8 illustrate examples of property files and UIs in an embodiment in accordance with techniques herein.

Referring to FIG. 4, shown is an example 200 including 3 property files 220*a-c* included in the look-up chain of property files read and processed by the look-up service 110 of FIG. 3. Directional arrow 210 may illustrate the predetermined left to right ordering in which the property files 220*a-c* are processed (e.g., property file A 220*a* is first processed, followed by property file B 220*b* which is then followed by property file C 220*c*). In this manner, property values in 220*c* may override any of the same property values specified in 220*b* and 220*a*. Furthermore, if a property value is specified for a property in 220*a* and 220*b* but not 220*c*, the value of 220*b* is the final resulting property value. A UI element is denoted by a unique ID. In this example, there are four UI elements denoted by ID1, ID2, ID3 and ID4. A particular property (PROPn) of a UI element (having IDn) is denoted as "IDn. PROPn". Property values may be specified using key-value pairs. For example, property PROPn of a UI element having IDX may be assigned a value VAL in the property file as follows: IDX. PROPn=VAL.

Element 202 may identify default values specified for different properties of each of the four UI elements ID1-ID4. Such default values of 202 may be defined by the application code 114 and/or library 112 if property values are not otherwise specified in any of the property files 220*a*-220*c*. In this example, each of the UI elements may have a first property, PROP2, denoting a display state of the corresponding UI element as one of enabled (ENABLE), disabled (DISABLE) or hidden (HIDE). By default as denoted by 202, all four UI elements may be enabled. When a UI element is enabled, it is displayed in the UI and active. When a UI element is disabled, it may be displayed in the UI (such as a greyed out UI element) but is not active or available for user interaction. When a UI element is hidden, it does not appear in the displayed UI. For UI element ID1, the property value for ID1. PROP2 is determined by first retrieving the value of DISABLE from property file 220*a* and the second value of HIDE from property file 220*b*. Although property file 220*c* exists, it does not specify any property value for ID1.PROP2 and therefore the final resulting value for ID1. PROP2 is HIDE (as specified in file 220*b*).

For UI element ID2, the property value for ID2. PROP2 is determined by first retrieving the value of HIDE from property file 220*a* and the second value of DISABLE from property file 220*c*. Although property file 220*b* exists, it does not specify any property value for ID2.PROP2 and therefore the final resulting value for ID2. PROP2 is DISABLE (as specified in file 220*c*).

For UI element ID3, the property value for ID3. PROP2 is determined by retrieving the value of HIDE from property file 220*c*. Although property files 220*a* and 220*b* exist, these property files do not specify any property value for ID3.PROP2 and therefore the final resulting value for ID3. PROP2 is HIDE (as specified in file 220*c*).

For UI element ID4, the property value for ID4. PROP2 is the default value of ENABLE as specified in 202. Although the property files 220*a*-220*c* exist, none of these files specify a property value for ID4.PROP2 and therefore the final resulting value for ID4. PROP2 is ENABLE (as specified in 202).

As mentioned elsewhere herein, in connection with the foregoing example of FIG. 4, the look-up chain denoted by element 210 may represent a prioritized ordering of property files, whereby if two different property files both specify a different value for the same property, the value assigned to the property in the file that occurs the latest in the lookup chain is the final resulting property value. Thus, the value assigned to the property in the latest occurring file in the look-up chain overrides any previous value assignments for the same property. In this manner, the look-up chain may define a prioritized ordering of multiple property files whereby a second file that occurs after a first file in the ordering may have a higher priority in that any values for properties in the second file may override values for the same properties occurring in the first file. The foregoing describes a processing order in which the property files may be traversed in terms of increasing priority so that all property files are traversed. Rather than perform processing whereby all property files are traversed in the look-up chain in the foregoing increasing prioritized ordering (e.g., such as illustrated by 210), an embodiment may alternatively process the property files in the reverse ordering (e.g., from highest to lowest priority thereby in a reverse ordering from that illustrated by 210). If a value for a property is determined by traversing the property files in order from highest to lowest priority, processing may not require traversing all property files in that processing performed to determine a value for a particular property may stop as soon as a first property value assignment for the particular property has been located in one of the property files. It should be noted that this property file processing order from highest to lowest priority may be generally performed in connection with any examples as described herein although processing may also be described in connection with processing property files from the lowest to the highest priority.

Figure 5:
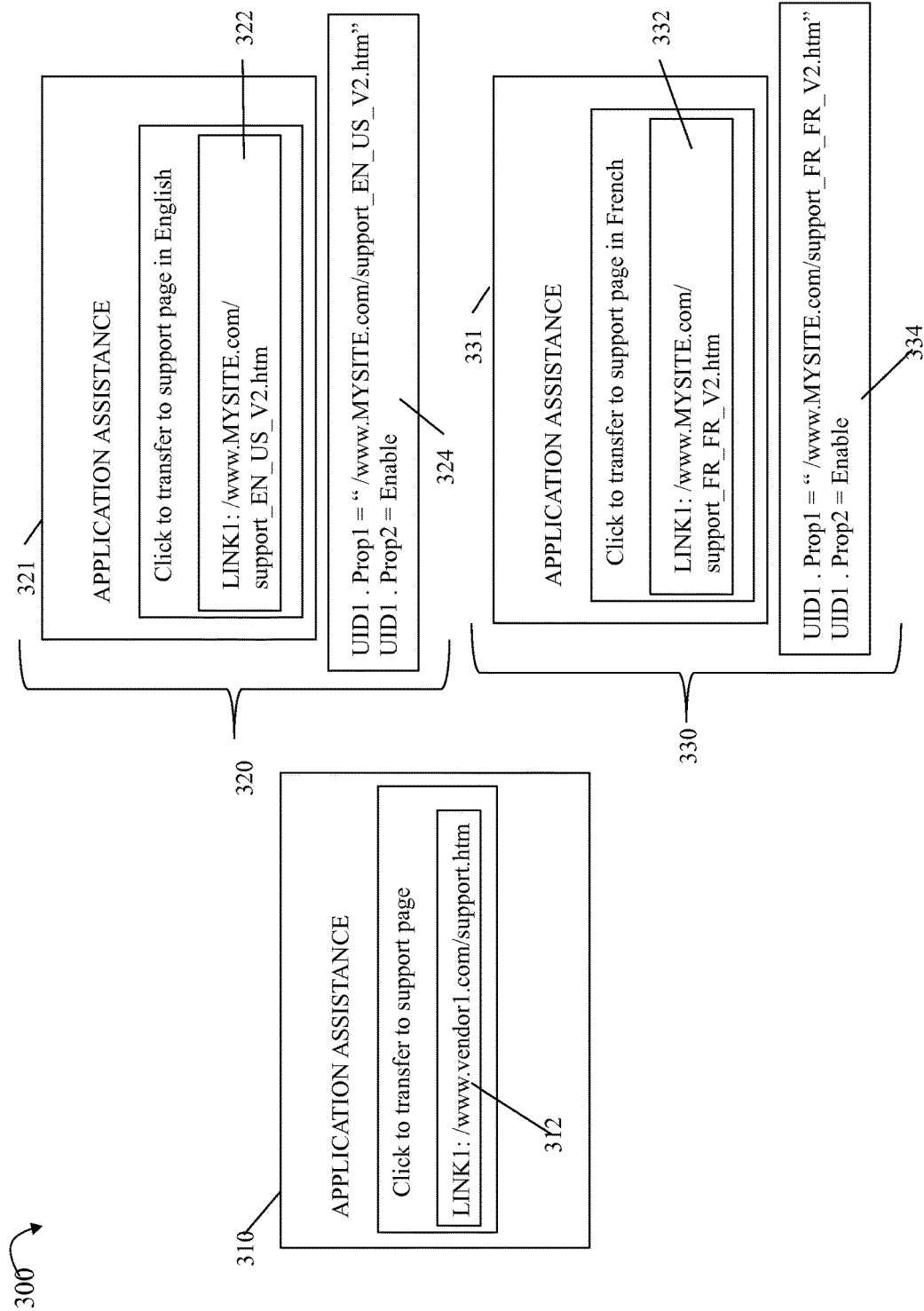

As another example, reference is made to FIG. 5. In the example 300 of FIG. 5, a UI may include a button or other UI element 312 providing a link to a support page. By selecting the UI element 312, the user may then be linked to another location providing the support page, for example, with resources and information for support assistance with the application. For this example, assume there is a first vendor 1 and a second vendor 2 in the sales and/or distribution chain. Vendor 1 may supply an application which is purchased for resale and/or redistribution by vendor 2. Thus, vendor 2 may customize aspects of the UI for the application using techniques herein by specifying property values in a property file.

Element 310 may illustrate a screenshot of a UI including a UI element 312 providing a hyperlink to a location of a web support page for vendor 1. If no customization is made by vendor 2, element 310 illustrates the default UI displayed. Upon selection of the hyperlink 312, the user will be linked to the the web page—/www.vendor1.com/support.htm—at vendor 1's website. The web page www.vendor1.com/support.htm is processed and displayed as the support page by default. UI element 312 may have a unique UI element identifier of UID1 with two properties—Prop 1 identifying the location of the webpage processed in response to selection of the UI element and Prop2 specifying a display state of enable, disable or hidden for the UI element 312.

Vendor 2, however, provides UI customizations for both the US in English and also for France in French using two property files included in the look-up chain. Element 320 includes a screenshot 321 of a UI customized using property values included in a first property file 324 for the US English variation by vendor 2. In this example 320, the displayed UI provides for transfer of control or display of a different support web page of the second vendor (rather than the first vendor) in English at www.MYSITE.com/support_EN_US_V2.htm.

Element 330 includes a screenshot 331 of a UI customized using property values included in a second property file 334 for the French variation by vendor 2. In this example 330, the displayed UI provides for transfer of control or display of a different support web page of the second vendor (rather than the first vendor) in French at www.MYSITE.com/support_FR_FR_V2.htm.

Figure 6:
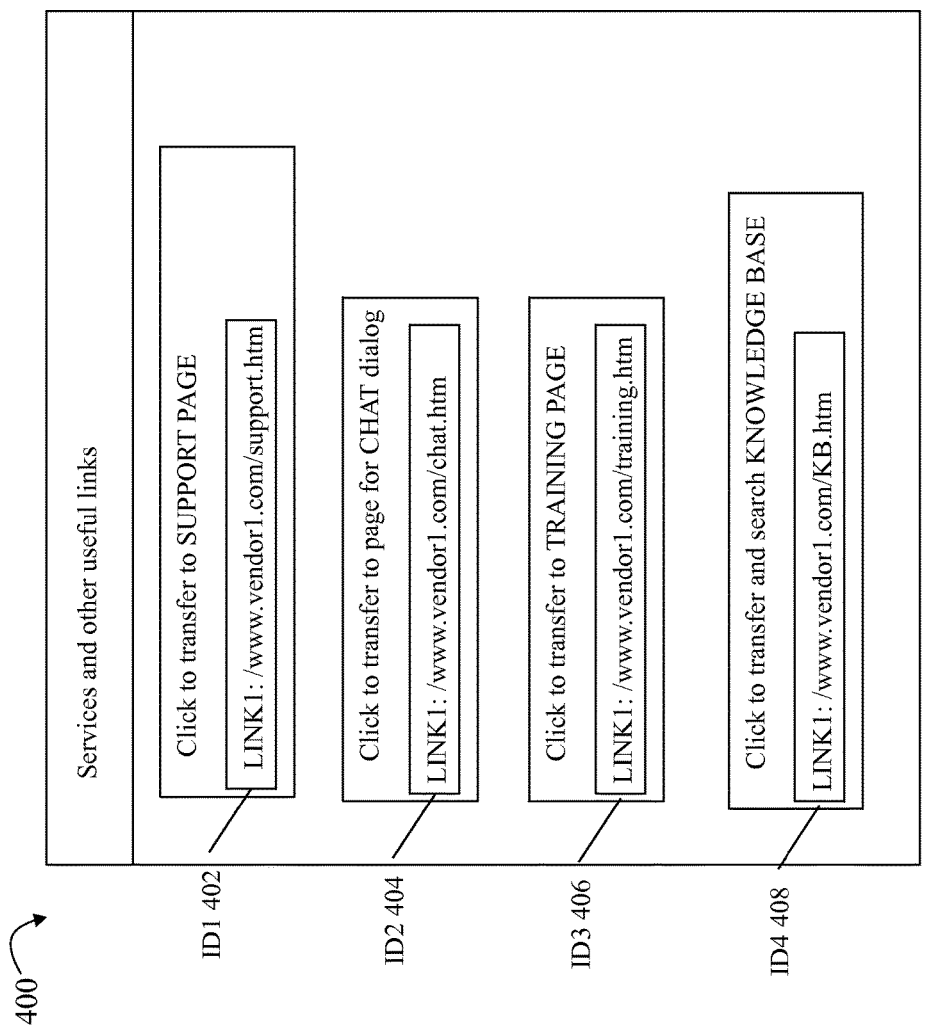
Figure 7:
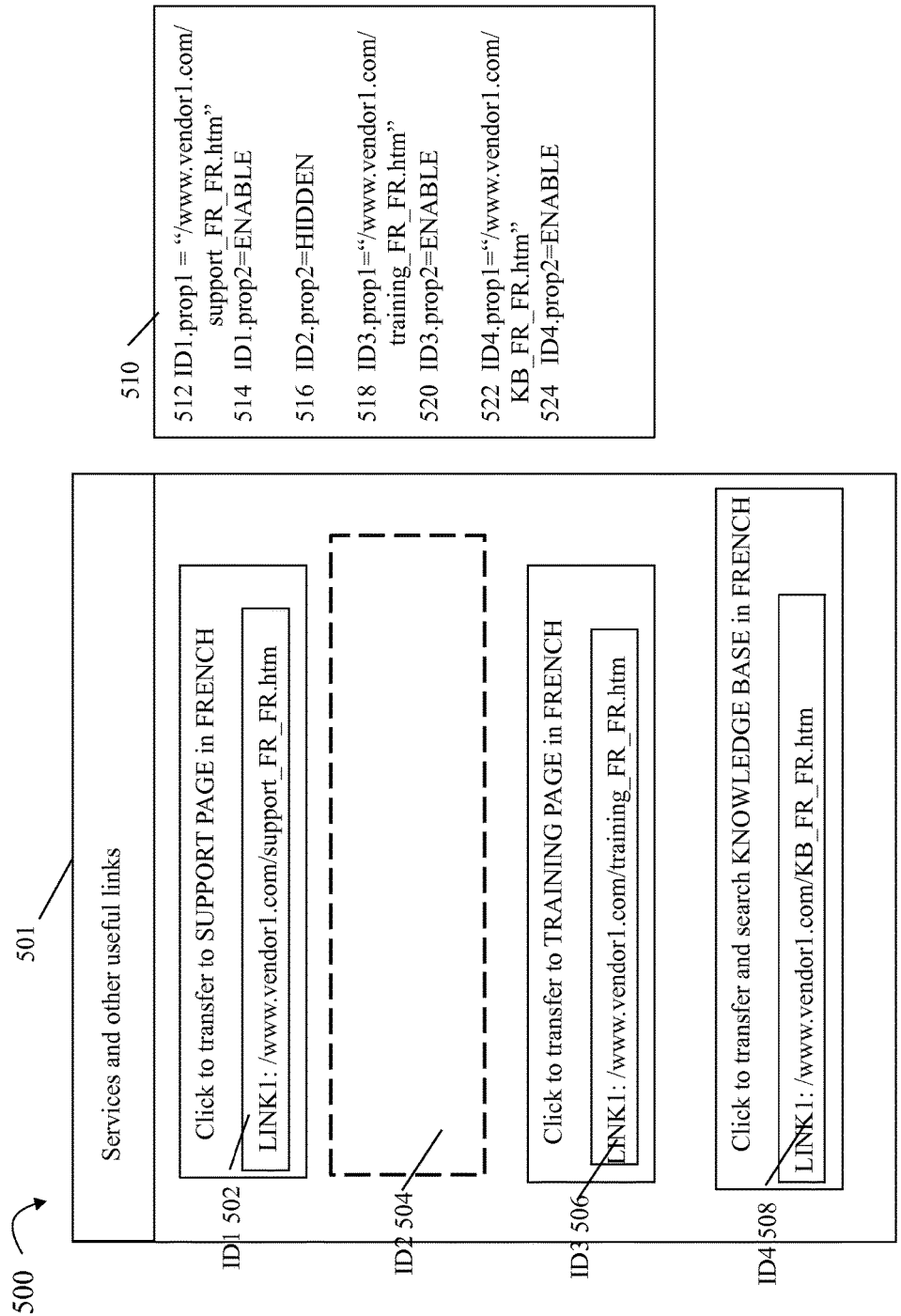
Figure 8:
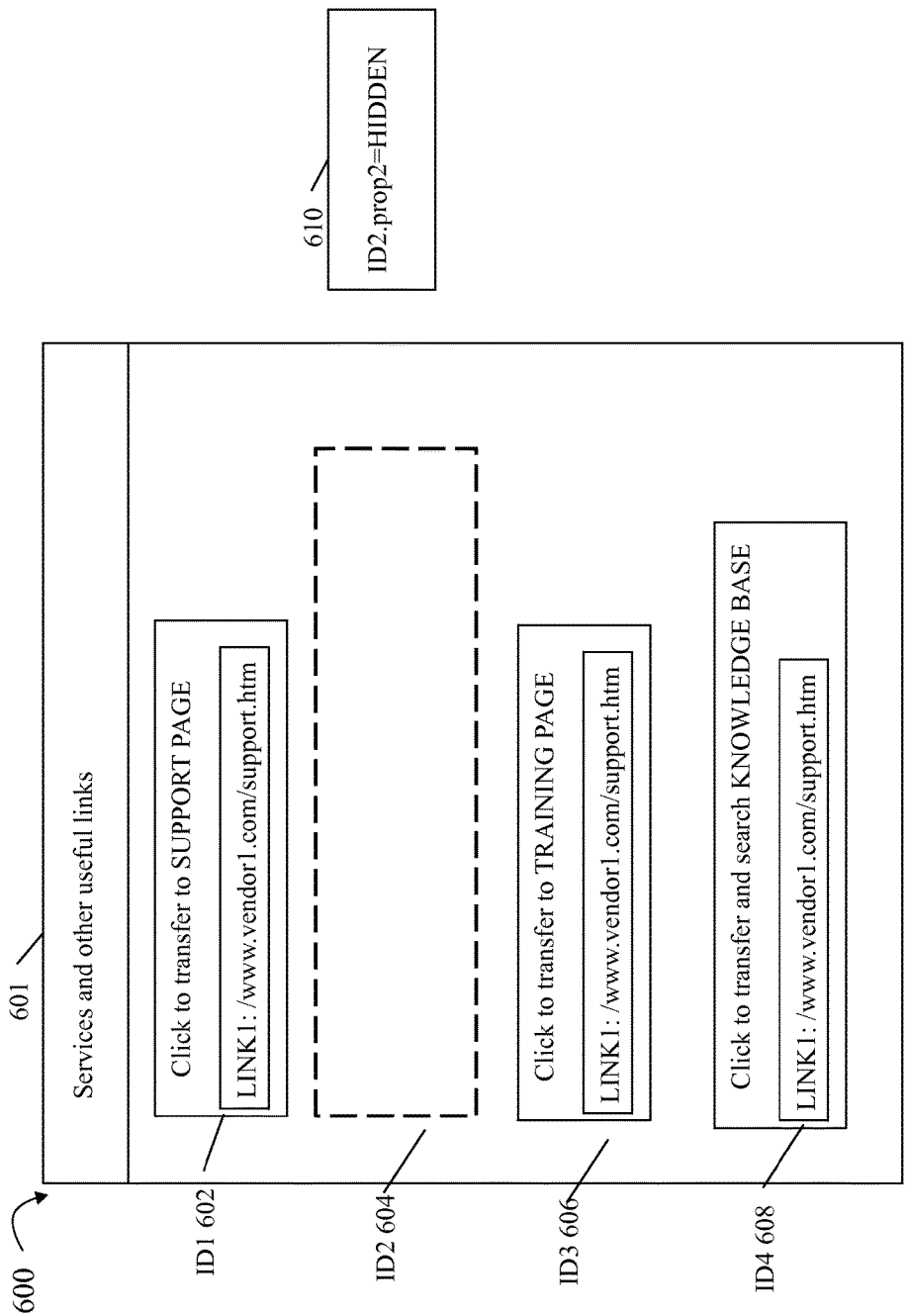

As another example, reference is made to FIGS. 6, 7, and 8. Referring first to FIG. 6, shown is a screenshot of a UI displayed with default values provided by the first vendor of an application. The displayed UI may include 4 UI elements denoted as ID1 402, ID2 404, ID3 406, and ID4 408 providing links to a support page as well as other useful links to pages including information related to the application provided by vendor 1. Each of the UI elements 402, 404 406 and 408 may have a unique UI element identifier and include two properties—Prop 1 identifying the location of the webpage processed in response to selection of the UI element and Prop2 specifying a display state of enable, disable or hidden for the UI element.

ID1 402 may be a UI element providing a link to a support page such as described above. ID2 may be a UI element providing a link to a page for a CHAT dialog. The CHAT dialog may provide for live chat interaction between a user and an agent or other support personnel such as for information regarding product sales, problems and trouble shooting, and the like. Thus, it may be that such a CHAT dialog is conducted in a particular language such as French or English. ID3 406 may be a UI element providing a link to a training page such as listing training classes offered by vendor 1 relate to the application and/or another product. ID4 408 may be a UI element providing a link to a knowledge base where a user may, for example, type in a question or key words used as query search terms for searching the knowledge base (e.g., database) of information. Such searching may be performed, for example, by a user wishing to retrieve information regarding a particular problem or topic of interest such as may be related to the application.

In this example, all UI elements 402, 404, 406 and 408 transfer control to a particular web page at vendor 1's website by default and are enabled.

With reference now to FIG. 7, vendor 1 may also include a language variant customization of the UI for French. Element 501 illustrates a customized version of the screenshot from FIG. 6 for French. The UI customizations may be specified using a property file 510 provided by vendor 1 which, when applied with the application's UI, results in a customized display of the UI 501. In this example, note that elements 512, 518, and 522 specify links to web pages that may be written in French or otherwise include customized variations particular to France or in the French language. Element 516 denotes that UI element ID2 504 is HIDDEN and therefore does not appear in the displayed UI. ID2 may be a UI element associated with a hyperlink for CHAT support. However, vendor 1 may not provide chat support in the French language. For example, vendor 1 may not employ French-speaking agents or other personnel for chat support service. Thus, when displaying the UI 501 in France as used by the French language user, UI element ID2 504 may be hidden as denoted by the italicized rectangle.

With reference now to FIG. 8, vendor 2 as described above may resell vendor 1's application and may only provide UI customizations for the US in English. Vendor 2 may not include a property file variant for UI customization in France or based on the French language. Thus, vendor 2 may include a single property file including content denoted by 610. In this example, vendor 2 does not offer chat service and wants to direct users to vendor 1's website and associated web pages as illustrated in the default screenshot of FIG. 6. Element 601 may denote the customized UI by vendor 2 as just described obtained by applying the property file 610.

It should be noted that the techniques herein may be utilized in an embodiment having a look-up chain of one or more property files including as few as a single property file or any number of property files.

What will now be described are techniques for generation and use of combined property files. A combined property file as described in more detail below may be generally characterized as including property values for properties of user interface elements obtained from multiple individual property files. Individual property files may be those property files described above such as, for example, elements 120a-n of FIG. 3. It may be desirable in some instances to allow initial creation of individual property files, such as for software development purposes, and then use techniques herein when preparing or building software components for a release to generate a combined property file to replace multiple individual property files. In this manner, the software components of the release may include the combined property file rather than the multiple individual property files. In one exemplary use, the techniques herein may be used when preparing a release build of software components that are shipped as a released version of a software product whereby the combined property file may be created and included in the released product as a software component rather than include the individual property files. Without use of combined property files, a customer's installed system may be populated with the many individual property files. Additionally, without use of combined property files, all the individual property files are requested by the look-up service (e.g., see element 110 of FIG. 3), thereby having to issue multiple requests for all individual property files. The multiple requests may be undesirable such as due to the overhead in making such requests. In contrast, an embodiment may use techniques herein to generate a combined property file replacing the multiple individual property files. In this manner, a single request for the combined property file may replace the multiple requests for the individual property files.

Figure 9:
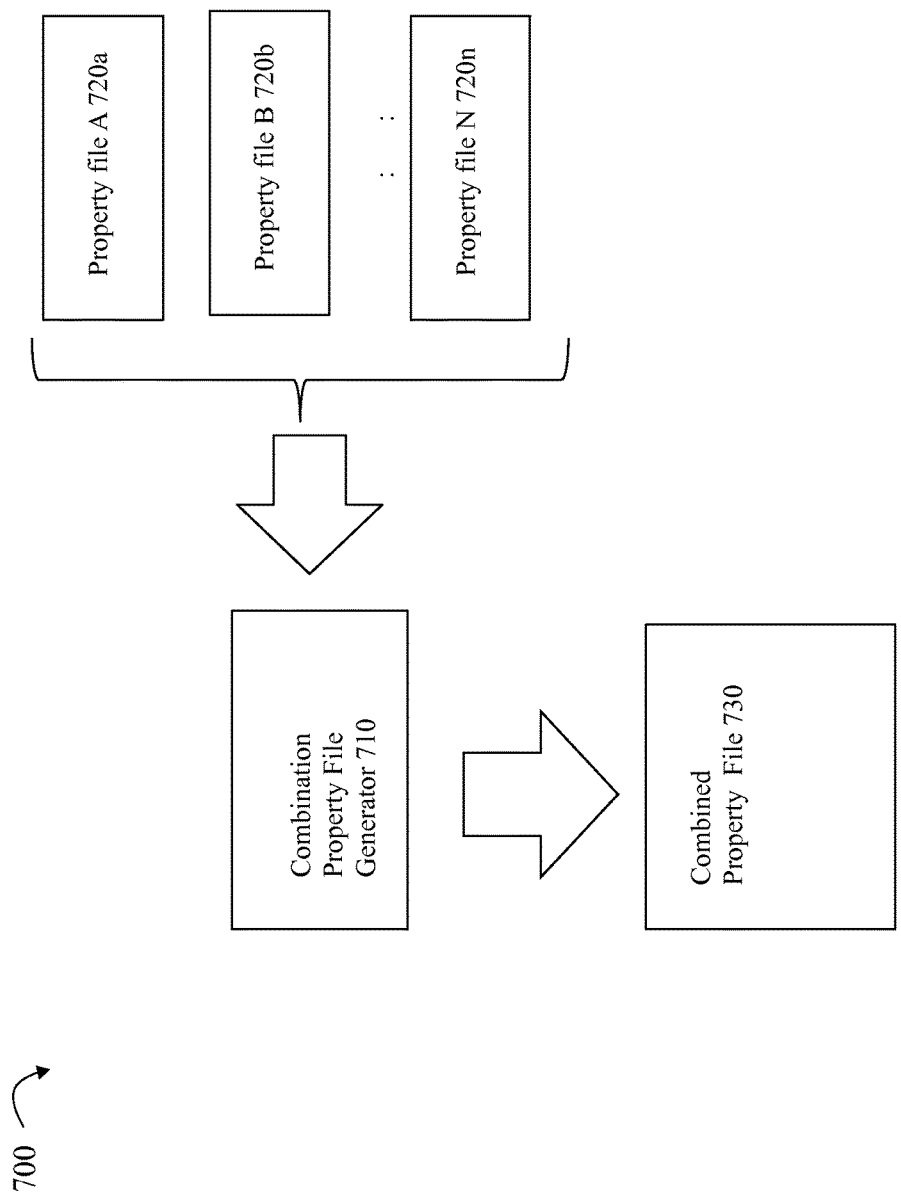
FIGS. 9, 9A and 9B are examples illustrating generation of combined property files in an embodiment in accordance with techniques herein.

Referring to FIG. 9, shown is an example 700 of components that may be used in connection with techniques herein to generate a combined property file. The combined property file generator 710 may be a code module that is executed to perform processing which reads in multiple property files 720*a*-720*n* and generates a combined property file 730. The combined property file 730 includes all the information from the individual property files 720*a*-720*n*. Each of the property files 720*a*-720*n* may include name-value pairs specifying different values for different properties used in connection with different UI elements as described elsewhere herein. The combined property file 730 may have any suitable format. Examples of some suitable formats for the combined property file 730 are described in more detail in following paragraphs.

It should be noted that the generator 710 may combine various selected ones of the property files having any suitable naming convention. For example, as described above, property files may be named in accordance with a predetermined property file naming convention pattern for an application for multiple lookup chains of property files such as:

APP_XX_YY_Vn.PROP where APP may denote a number of one or more characters associated with identifying a particular application, XX is a two letter coding denoting a particular language, YY is a two letter coding denoting a particular country, and Vn denotes property files provided by a particular vendor denoted by "n". In connection with Vn as described elsewhere herein, "n" may be an integer such as greater than zero and each vendor may be uniquely identified using a different integer value for "n".

Figure 9A:
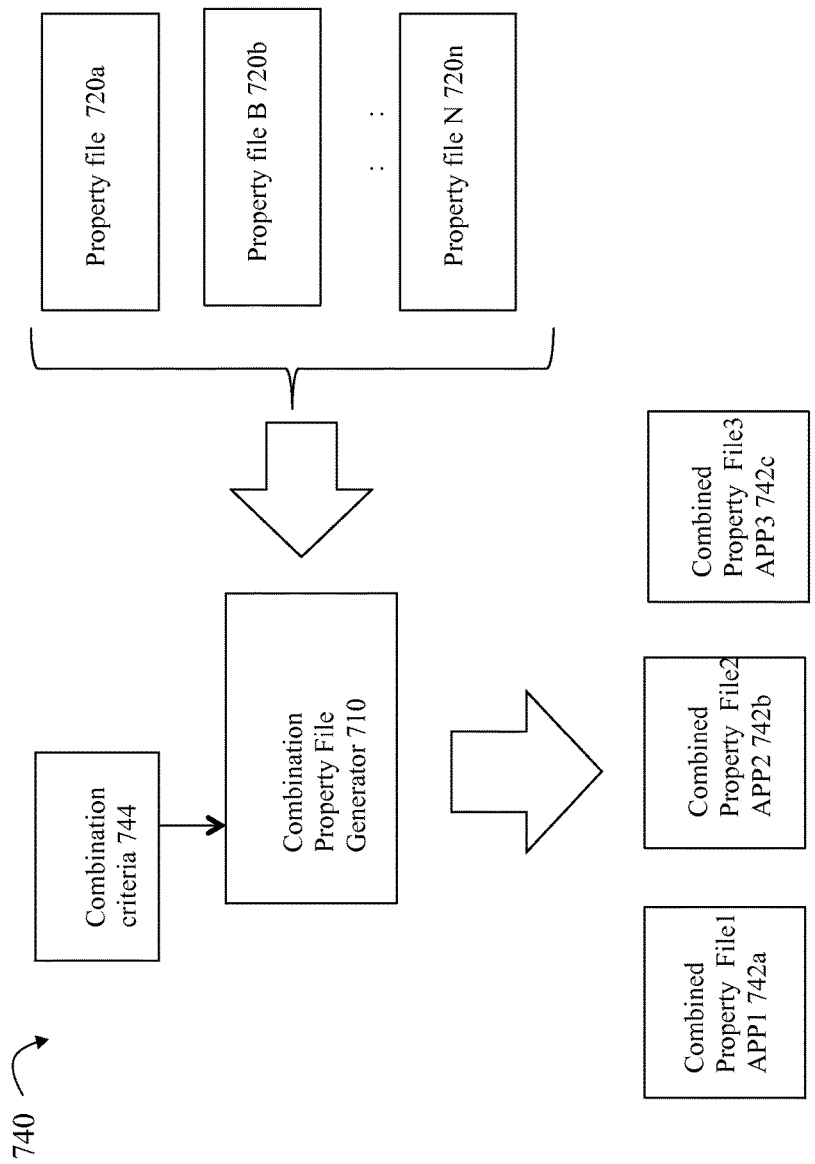

With reference to FIG. 9A, the generator 710 may combine a selected portion of property files 720*a*-*n* based on combination criteria 744 identifying one or more of property files 720*a*-720*n* to be combined. The combination criteria 744 may be provided as an input to the generator 710. Assume that the set of property files 720*a*-*n* includes property files for 3 applications, APP1, APP2 and APP3, based on the above-mentioned naming pattern. Property files used in connection with properties for the first application, APP1, may have names of the general form APP1_XX_YY_Vn.PROP. Similarly, property files for the second application, APP2, may have names of the general form APP2_XX_YY_Vn.PROP, and property files for the third application, APP3, may have names of the general form APP3_XX_YY_Vn.PROP.

As a first example, the generator 710 may receive combination criteria 744 to generate 3 different combination files 742*a*-*c*. The combination criteria 744 may include information to combine a first portion of the property files 720*a*-*n* for APP1 into a first combined property file 742*a*, to combine a second portion of the property files 720*a*-*n* for APP2 into a second combined property file 742*b*, and to combine a third portion of the property files 720*a*-*n* for APP3 into a third combined property file 742*c*. To generate the combined property file a 742*a* for APP1, the combination criteria 744 may identify such property files as all those having APP1 as the first portion of the property file name. The property files for APP1 may be expressed as those having the naming convention APP_XX_YY._Vn.PROP. In terms of regular expression notation, the property files for APP1 may be expressed as those having the naming convention APP1*.PROP. In a similar manner, the combination criteria may include information identifying selected ones of the property files 720*a*-*n* to be combined respectively, for APP2 into the combined property file2 742*b* and for APP3 into the combined property file2 742*c*.

Figure 9B:
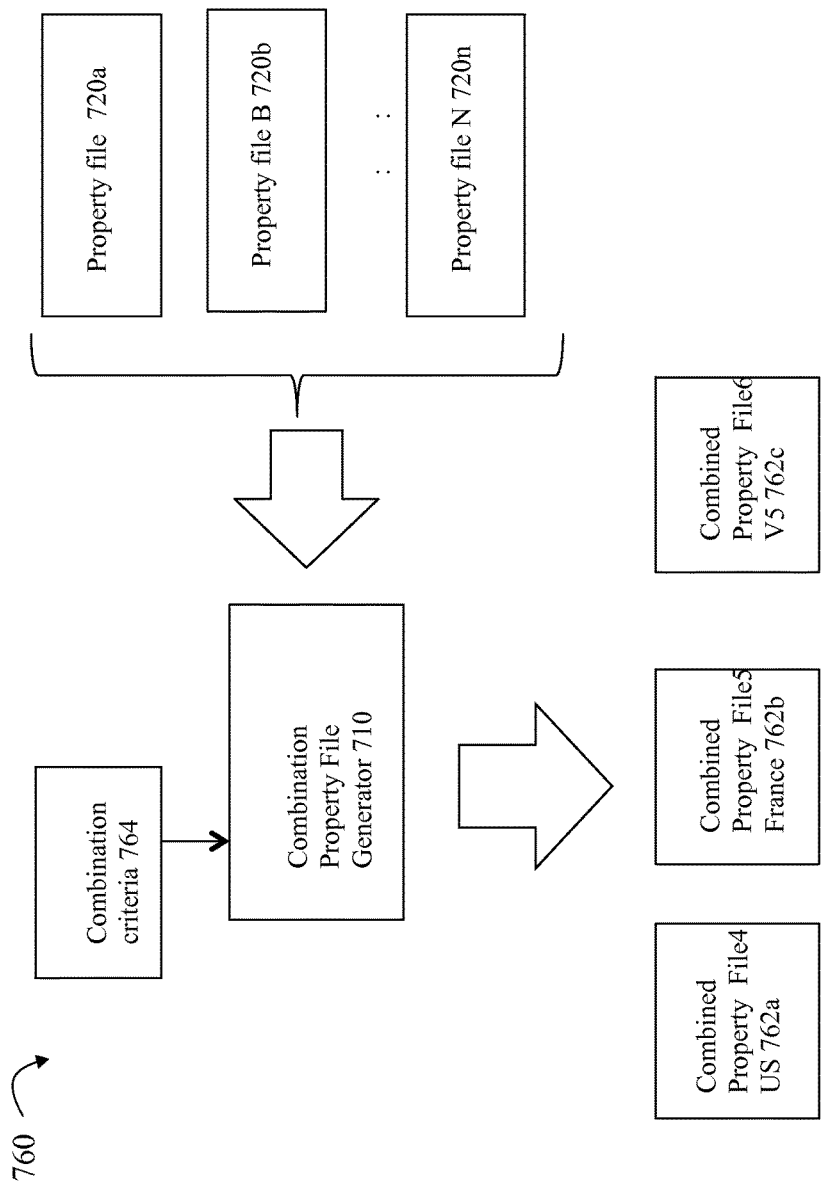

As a second example with reference to FIG. 9B, the generator 710 may receive combination criteria 764 to generate 3 different combination files 762*a*-*c*. The combination criteria 764 may include information to combine a portion of the property files 720*a*-*n* for a particular country. Assume US represents the two letter code for United States and FR represents the two letter code for France. Consistent with the property file naming convention noted above, property files across all 3 applications used for the US occur when YY as in the property file name="US" having the general form of: *_US.PROP. The combination criteria 764 may include information identifying all US property files as just noted to generate a fourth combined property file 762*a*. Consistent with the property file naming convention noted above, property files across all 3 applications used for France occur when YY as in the property file name="FR" having the general form of: *_FR.PROP. The combination criteria 764 may include information identifying all France (FR) property files as just noted to generate a fifth combined property file 762*b*.

Also, assume that V5 represents a particular distributor or vendor. Consistent with the property file naming convention noted above, all property files for this particular distributor or vendor V5 occur when Vn as in the property file name="V5" having the general form of: *_V5_*. PROP. The combination criteria 764 may include information identifying all property files for V5 as just noted to generate a sixth combined property file 762*c*.

In this manner, the combination criteria 764 may more generally include information to select one or more property files for combining into a combined property file whereby the combination criteria may include information based on the predetermined property file naming convention used to identify and select the files which are combined.

It should be noted that the portion of the individual property file name "APP" denoting an application may also, more generally, denote different code execution entities. For example, a unique sequence of one or more characters may be used as an APP portion of the individual property file name to denote code executed in connection with a particular dialogue, wizard, and the like. Thus, more generally, if there is only a single application having its own set of code entities (e.g., dialogues, wizards and the like) requiring customized property values, the individual property file names may not require designation of a particular application and may rather use the portion of the individual property files name space denoted as APP herein to denote a particular one of the different code entities within the single application. If there are multiple possible applications whereby each such application may include its own set of code entities requiring customized property files, the portion of the individual property files name space denoted as APP herein may indicate a particular one of the multiple applications and also the particular code entity of the particular application. For example, application 1 may be denoted as APP1 and application 2 may be denoted as APP2. Each of these application may include two dialogues denotes a D1 and D2. In this manner, individual property files may include a filename denoting an encoding for both a particular application (e.g., APP1 or APP2) in combination with a particular dialogue (e.g., D1 or D2). In this manner, to further illustrate with reference back to FIG. 9B, an embodiment may provide combination criteria 764 identifying all property files for a particular application such as APP1 combined into a single combined property file. As a variation, combination criteria 764 may specify to combine property files for a particular application such as APP1 and its dialogue D1 into a first combined property file, and also to combine property files for the particular application APP1 and its dialogue D2 into a second different combined property file. In this manner, property files may be combined for a particular code entity of a particular application.

With reference back to FIG. 9, the generator 710 may generate metadata for each individual property file 720a-n received as an input and the property file metadata may be included in the combined property file 730. The generator 710 may also generate metadata for the combined property file 730 itself whereby such combined property file metadata is included in the combined property file 730. Generally, the property file metadata is information about an individual property file. In one aspect, the property file metadata may be characterized as a descriptor of information about one of the property files 720a-n. In a similar manner, the combined property file metadata is information about generated combined property file (e.g., the combined property file metadata may be characterized as a descriptor of information about the combined property file 730). The foregoing metadata about the individual property files 720a-n and, optionally, the metadata about the combined property file 730 may be included in the combined property file 730.

Figure 10:
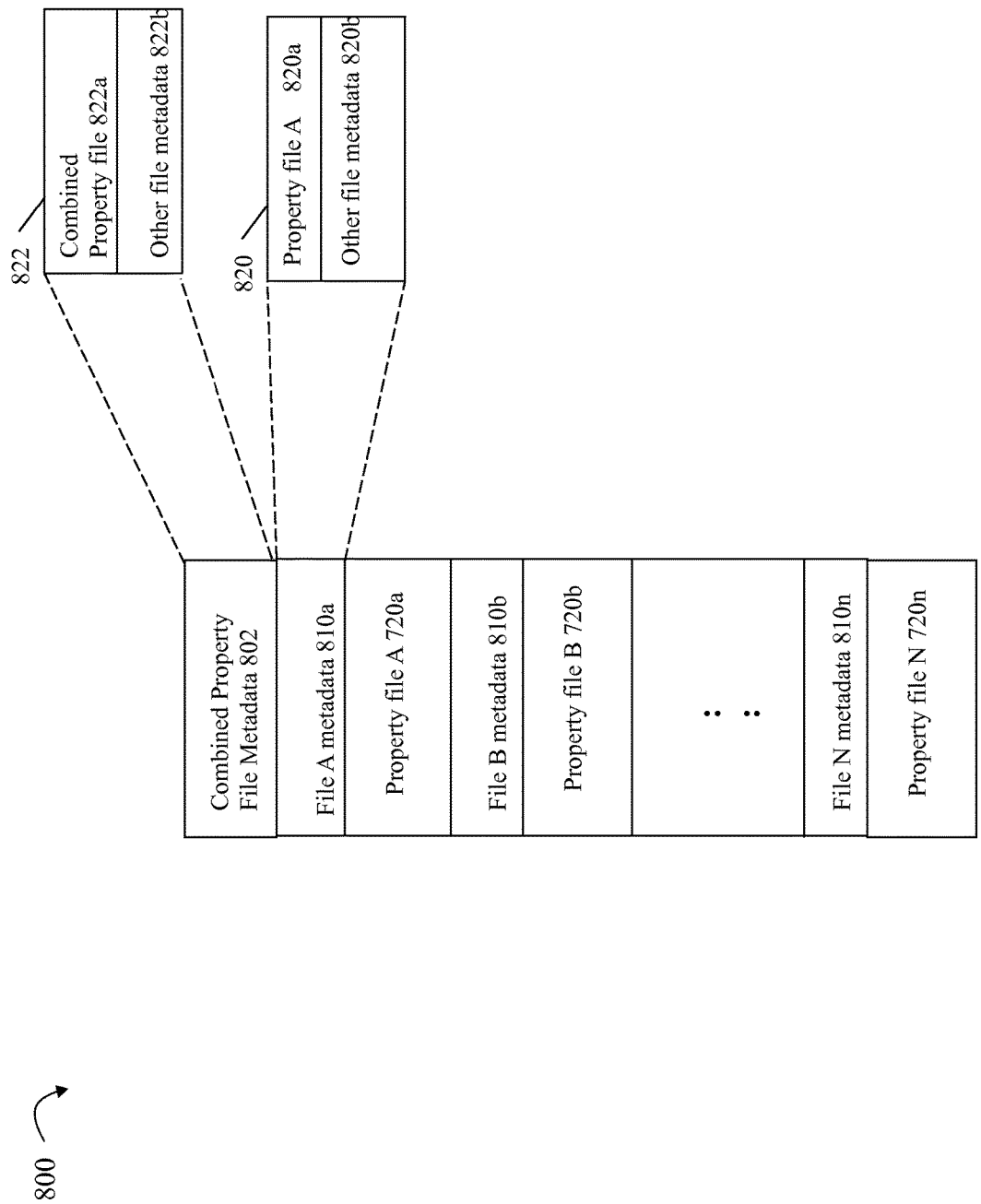
FIGS. 10 and 11 are examples of combined property file formats that may be used in an embodiment in accordance with techniques herein.

Referring to FIG. 10, shown is a first exemplary representation 800 of a combined property file that may be used in an embodiment in accordance with techniques herein. The example 800 illustrates a first format of a combined property file, such as denoted by element 730 of FIG. 9. The combined property file in the example 800 may include property files 720a-n, metadata portions 810a-n for the N property files read in by the generator 710 and combined property file metadata 802.

In the example 800, file A metadata 810a is generated and included in the combined property file prior to property file A 720a. File B metadata 810b is generated and included in the combined property file prior to property file B 720b. File N metadata 810n is generated and included in the combined property file prior to property file N 720n. The combined property file of the example 800 may also include combined property file metadata 802.

Element 820 provides further detail regarding information that may be included in property file metadata portion 810a. Property file A's metadata 810a may include the name of the property file, Property file A, denoted by 820a, and may also optionally include other file metadata 820b. The other file metadata 820b may include, for example, a size of the property file data (such as in bytes), version information, a source location from which property file A was obtained or read in by the generator 710, date/time information identifying the date/time associated with property file A, and the like. It should be noted that although the further details of element 820 are only illustrated in FIG. 10 for property file A, each of the file metadata portions 810b-n may include similar information for their respective property files.

Element 822 provides further detail regarding information that may be included in the combined property file metadata 802. The combined property file metadata 802 may include the name of the combined property file denoted by 822a, and may also optionally include other file metadata 822b. The other file metadata 822b may include, for example, a size of the combined property file data (such as in bytes), version information, date/time information identifying the date/time that the generator 710 created the combined property file, and the like.

The example 800 illustrates a combined property file layout or format whereby the property file metadata for each property file may immediately precede the property file. For example, file A's metadata 810a may appear in the combined property file immediately prior to the property file A 720a. More generally, a property file's metadata may be located adjacent to the property file. In this manner, as a variation to the illustration of FIG. 10, the metadata for each individual property file may alternatively be located following the property file whereby the locations of 810a and 720a in the combined property file may be reversed. In a similar manner, the combined property file may reverse or swap the ordering of each property file and its associated metadata in the combined property file (e.g., ordering of 810b and 720b are reversed, ordering of 720n and 810n are reversed). Also, the example 800 illustrates that the combined property file metadata 802 is located at the beginning of the combined property file. As a variation, the combined property file metadata 802 may be omitted, or may be included at the end of the combined property file (e.g., following property file N 720n).

Figure 11:
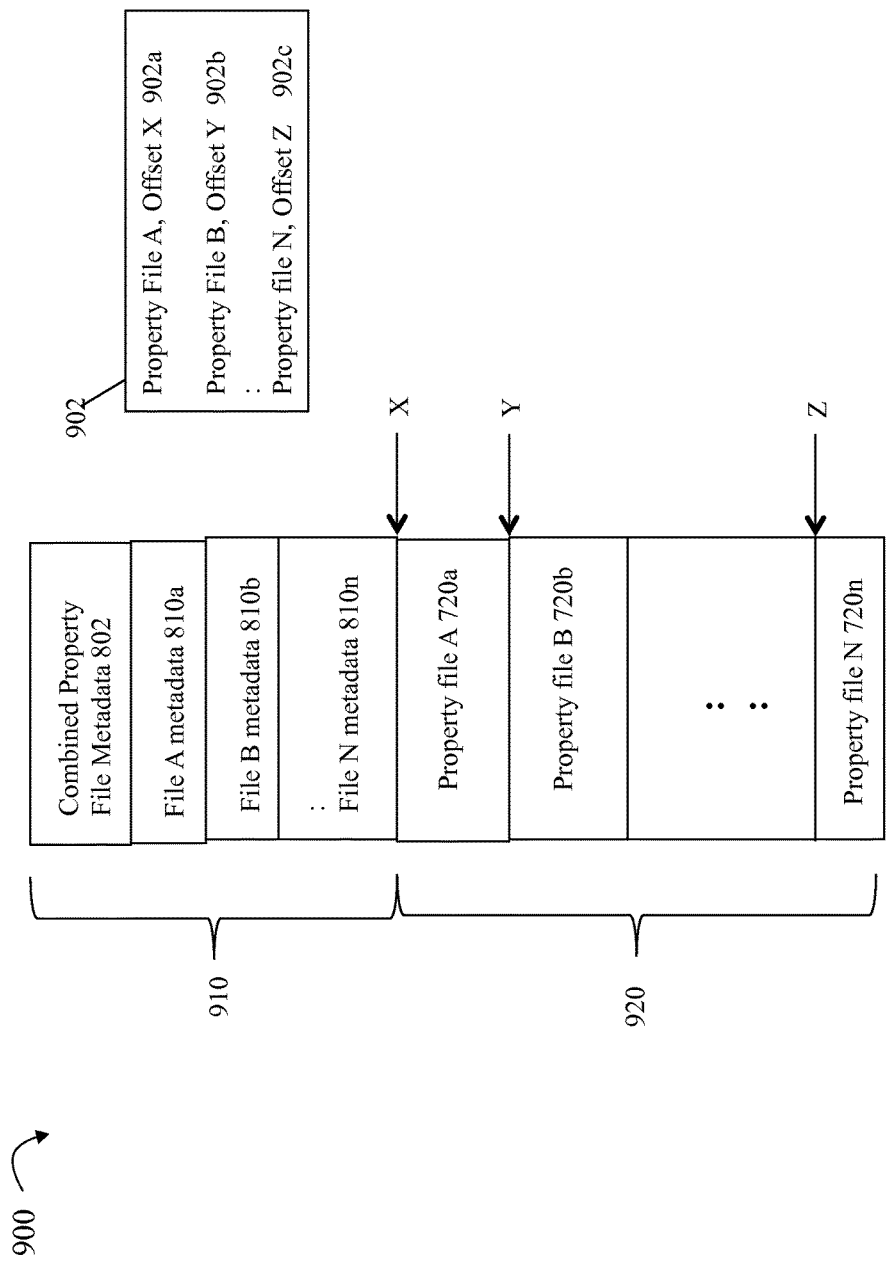

Referring to FIG. 11, shown is a second exemplary representation 900 of a combined property file that may be used in an embodiment in accordance with techniques herein. The example 900 illustrates a second format of a combined property file, such as denoted by element 730 of FIG. 9. The combined property file in the example 900 may include property files 720a-n, metadata portions 810a-n for the N property files read in by the generator 710 and combined property file metadata 802 as described in connection with FIG. 10 with some differences. A first difference is that all metadata portions 810a-n and 802 (optionally included) may be included in a first portion 910 of the combined property file followed by a second portion 920 of all property files 720a-n. A second difference is that the first portion of metadata 910 may include additional information 902 denoting a starting offset or index of each of the property files in the second portion 920. Element 902 is an example illustrating in more detail this additional metadata information included in the first portion 910. As illustrated by 902, element 902a is information denoting a starting address or offset X of property file A within the combined property file, element 902b is information denoting a starting address or offset Y of property file B within the combined property file, and element 902c is information denoting a starting address or offset Z of property file N within the combined property file. In one embodiment, the offset or address for each property file may be included in the per property file metadata portions 810-n. For example, the offset X of 902*a* may be included in file A metadata 810*a*, the offset Y of 902*b* may be included in file B metadata 810*b* and the offset Z of 902*c* may be included in file N metadata 810*n*. As an alternative, the information of 902 may be collectively included in the combined property file metadata 802. Each of X, Y and Z may identify an address or offset within the combined property file. Such values may be absolute offsets with respect to the starting or base address of 0 denoting the first logical address or starting location of the combined property file.

A property file read in as an input to the lookup service may be characterized as having a property file type of either "combined" or "individual". The type of "combined" may denote a one of the combined file formats such as, for example, one of the combined file formats as described in connection with FIGS. 10 and 11. The type of "individual" may denote that the property file is an individual or non-combined property file. Examples of individual property files are property files 120*a-n* of FIGS. 3 and 720*a-n*. Thus, consistent with other discussion herein, each individual property file may include content and, more generally, values for properties affecting the manner in which UI elements of a UI are displayed and operate for one set of customized UI elements for a particular application. As described elsewhere herein, the properties in a single property file may be customized based on a combination of factors such as, for example, application, language, geographical location, country, vendor or distributor, and the like. In this manner, first and second property files may each include different property values providing for different customized UI elements. The combined property file may be characterized as including multiple sets of such property values providing for multiple sets of UI element customizations.

Referring back to FIG. 3, shown are components that may be used in connection with an embodiment at runtime to determine a property value in an embodiment in accordance with techniques herein.

Figure 12:
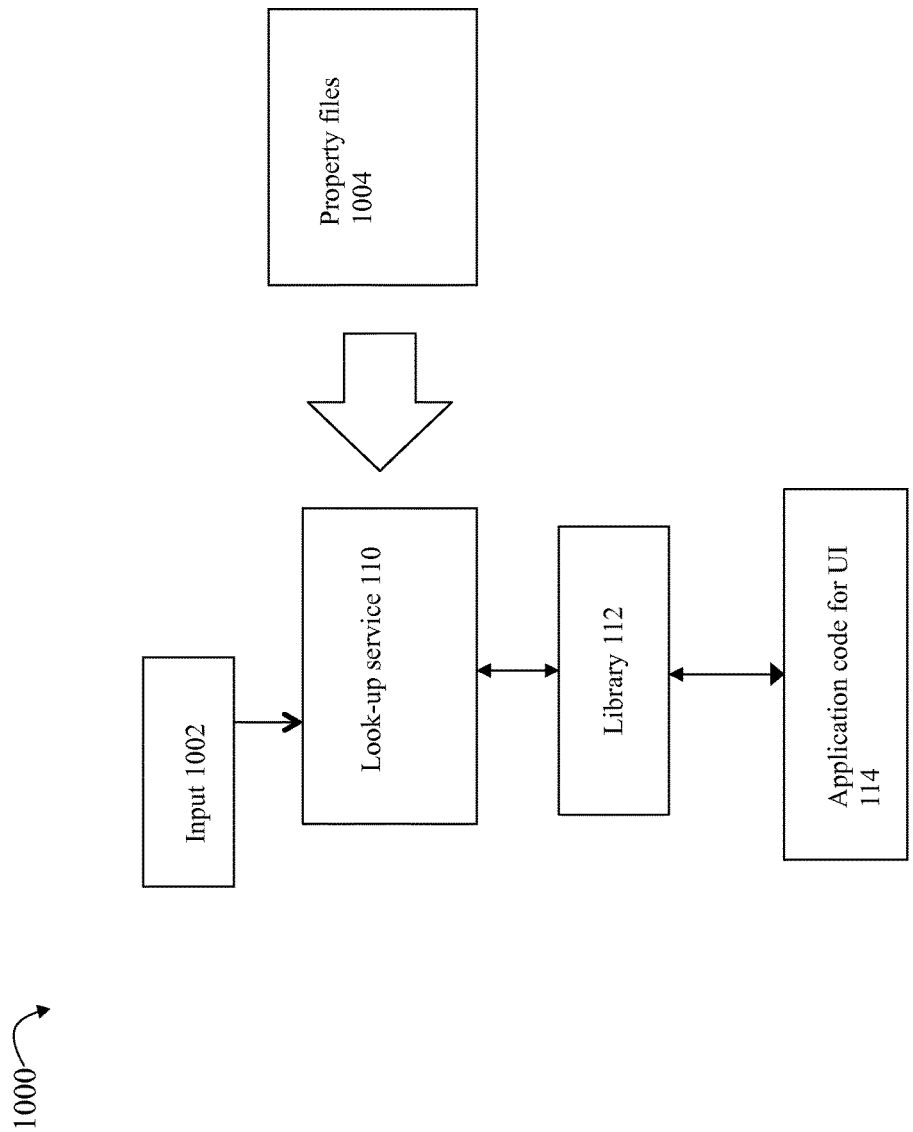

What will now be described with reference to FIG. 12 are components as described in connection with FIG. 3 with the additional input 1002 denoting whether the one or more property files 1004 are individual property files (e.g., elements 720*a-n* as described in connection with FIG. 3) or are combined property files (e.g., multiple instances of 730 as just described in connection with FIG. 9).

With reference to FIG. 12, an input 1002 may be provided to the lookup service 110 executing at a point in time indicating whether property files 1004 read in by the lookup service 110 are individual property files or combined property files. In this embodiment, the property files 1004 may be of only a single type—all property files are either combined property files of the same format or layout (e.g., either all as in FIG. 10 or all as in FIG. 11) or all property files read in are individual property files. The lookup service 110 may be provided with an input 1002 such as at runtime when the lookup service 1002 commences execution, which identifies the property file type as either individual or combined. The lookup service 110 may be coded with logic which performs first processing when the property files 1004 provided as input are individual property files, and second processing when the property files 1004 provided as input are combined property files. The code of the lookup service may expect each of the property types to have predetermined formats such as described herein.

As a further variation, an embodiment may support multiple combined property file formats or layouts as well as individual property files. In this case, the possible property files types may include a different type identifying each different file format. For example, assume an embodiment supports individual property files, a first combined property file format as in FIG. 9 and a second combined property file format as in FIG. 10. The property file types may be individual denoting an individual property file such as one of 720*a-n*, combined1 denoting a first combined property file format such as illustrated in FIG. 9 and combined2 denoting a second combined property file format such as illustrated in FIG. 10. The foregoing may be generalized to support any number of supported file formats or layouts.

As a variation to the foregoing, the lookup service 110 may be provided with property files 1004 of multiple types whereby not all of the property files 1004 are of the same type. In this case, the property files 1004 read as inputs may include information or metadata denoting the property file type as individual or combined, or one of a plurality of possible combined file formats. In one embodiment, a combined property file may include combined property file metadata such as described in connection with FIGS. 10 and 11. The combined property file metadata may be read in by the lookup service 110 identifying whether the following data of the property file has a layout or format of a combined property file such as in FIG. 10 or FIG. 11. For example, the combined property file metadata 802 may include a name-value pair such as where the name is a reserved keyword denoting the combined property file, and the value is the name or identifier of the combined property file. To further illustrate, the following may be included in the combined property file metadata 802:

Combined_property_file="FILE1"

denoting that the property file is a combined property file having a name or identifier FILE1. Also, if there are multiple supported combined property file formats or layouts a second line in the combined property file metadata 802 may identify the particular combined property file format. For example, assume that there are two supported combined file format as described in connection with FIG. 9, a first format, and FIG. 10, a second format. The second line in the combined property file metadata 802 may be:

Layout="1"

denoting that the current combined property file has the first format of FIG. 9. If the second line is alternatively:

Layout="2"

then the combined format denoted for the current combined property file is the second format of FIG. 10.

More generally, the value associated with the Layout name above may be any one of a set of predetermined values each identifying a different supported property file layout or format. If the first line of the file does not include the name-value pair of Combined_property_file as noted above, the lookup service 110 may by default assume that the property file is an individual property file format (e.g., such as 720*a-n* of FIGS. 9 and 110*a-n* of FIG. 3). In this manner, the lookup service may read the first line of the file to determine whether to process the remaining file contents as a combined property file or an individual property file (e.g., in accordance with the combined property file layout or individual property file layout).

In connection with techniques herein with reference to FIG. 12, one or more combined property files may be provided as inputs to the look-up service and may be processed in a manner as described herein as the individual property files with respect to determining UI element property files based on a defined lookup chain or priority chain defining an ordered list of property files (e.g. see FIG. 4 for an example). In other words, the different property values included in the combined property file and obtained from different individual property files may be processed in a manner similar to that as if the property values were read in directly from the individual property files by the look-up service.

With reference back to FIG. 9 to further illustrate how and when the combined property file 730 may be utilized, the combined property file 730 may be read as an input by the look-up service 110 rather than the individual property files 120*a-n* as illustrated. In one embodiment, the processing described in connection with FIG. 9 to generate the combined property file 730 may occur at build time in connection with generating the software components included in a released software product. In this manner, one or more combined property files 730 may be generated by the development team or software vendor at a first point in time whereby the combined property files 730 are components included in a released product along with other software components (e.g., look-up service 110, library 112) of the released product. In this manner, the individual property files may be used and generated by software development. When the time comes to run a build to generate the software components of the released product, one or more combined property files may be generated and included in the released product.

As a variation to the foregoing and rather than including combined property files in a released product, an embodiment may ship the released product with software components including the individual property files 720*a-n* and combined property file generator 710. In this manner, the components 720*a-n* and 710 may be installed on a customer system with the released product. Once installed, the generator 710 may be executed to generate the one or more combined property files 730. The foregoing generation of the one or more combined property files 730 at an installed site may be performed at any suitable time. As a first example, the foregoing generation of one or more combined property files 730 may be performed as part of the installation of the released product. As a second example, the foregoing generation of one or more combined property files 730 may be performed when code utilizing the library 112 and lookup service 110 is launched or commences execution. As a third example, the foregoing generation of one or more combined property files 730 may be performed on demand/when requested. In connection with this third example, an update may be shipped which replaces or adds an individual property file. Any combined property file including the replacement or new individual property file may be accordingly regenerated at the customer installed site on demand.

With reference to FIG. 12, existing the property files (individual and/or combined property files) may be loaded on demand as needed by the look-up service. This is described in more detail below.

Figure 13:
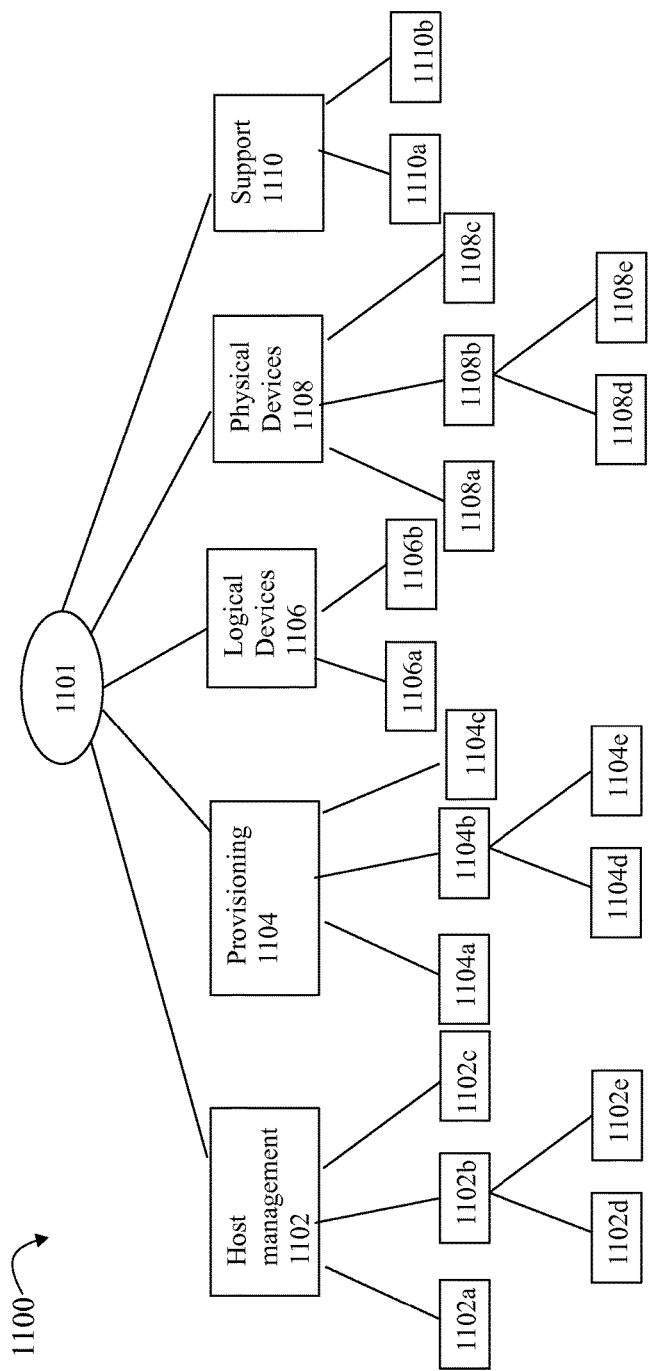
FIGS. 13 and 14 illustrate use of combined property files with UI navigation that may be used in an embodiment in accordance with techniques herein.

Referring to FIG. 13, shown is an example 1100 of a hierarchical structure associated with a GUI's displays or screenshots in an embodiment in accordance with techniques herein. For example, the example 1100 illustrates a hierarchical structure corresponding to UI displays or pages that the user may navigate to such as in connection with data storage management application. The structure 1100 in this example forms a tree having a root node 1101 at level 0, nodes 1102, 1104, 1106, 1108 and 1110 at level 1, nodes 1102*a-c*, 1104*a-c*, 1106*a0b*, 1108*a-c* and 1110*a-b* at level 2, and nodes 1102*d-e*, 1104*d-e* and 1108*d-e* at level 3. A node at level N may have child nodes connect to it at level N+1. For example, nodes 1102*a-c* are child nodes of node 1102 and node 1102 is the parent node of child nodes 1102*a-c*. A node which has no child nodes is also a leaf node. A path may be defined from the root at level 0 to a second node at another level greater than 0 in the hierarchy whereby the path includes the root node and any intervening nodes traversed from the root to reach the second node. For example, a path may defined by 1101, 1106, 1106*b*. A second path may be defined by 1101, 1108 1108*b*. More generally, a path may be defined between two nodes in the tree as follows: a path between a first node at level N to a second node at a level M>N may represent a navigational path through UI displays of each node on the path. A first node may be a descendant of a second node if the second node is included in a path from the root to the first node (e.g., there are one or more intervening nodes connecting the second node to the first node where each node in the path is at a different level in the hierarchy).

Element 1101 is the root denoting that initially, the UI display may include a first level of menu options, buttons or other UI elements for host management 1102, provisioning 1104, logical devices 1106, physical devices 1108 and support 1110. Thus the nodes 1102, 1104, 1106 and 1108 at level 1 may represent the major partitioned navigational sections of the UI displays. Each of the nodes in levels 2 and 3 may represent a UI display or page that may be rendered in connection with UI navigation. A user may navigate to a UI display corresponding to a first node at level 2 by selecting the UI element corresponding to the first node's parent at level 1. A user may navigate to a UI display corresponding to a first node at level 3 through the first node's parent at level 2.

A user may select a UI element associated with any one of 1102, 1104, 1106, 1108 and 1110 and result in rendering another UI display associated with a child node of the selected node. For example with reference to FIG. 14, element 1101 may illustrate the initial UI display corresponding to the root node including 4 UI elements 1101*a-d* such as buttons for host management, provisioning, logical devices, physical devices and support. In this example, selecting hosts 1101*a* may result in a UI display 1102 corresponding to the node in FIG. 13 having the same number. The UI display may include 3 hyperlinks or navigational links (such as in connection with navigating in a browser)—LINK1, LINK2, and LINK3. Selection of LINK 1 of 1102 may result in UI navigation to UI display 1102*a*. Selection of LINK 2 of 1102 may result in UI navigation to UI display 1102*b* having two links LINK4 and LINK 5. Selection of LINK 4 of 1102*b* may result in UI navigation to UI display 1102*d*. Selection of LINK 5 of 1102*b* may result in UI navigation to UI display 1102*e*. Selection of LINK 2 of 1102 may result in UI navigation to UI display 1102*c*.

Thus, UI displays and associated UI elements associated with a single application may be partitioned into major navigational sections of the hierarchy as illustrated by the 5 groupings at level 1 of FIG. 13. In this manner, a different combined property file may be created including UI elements and associate property values for each of the 5 groupings (e.g., 5 combined property files). To further illustrate, assume a first combined property file includes properties for UI elements for a first portion of UI displays for host management for application 1, a second combined property file includes properties for UI elements for a second portion of UI displays for provisioning for the same application 1, third combined property file includes properties for UI elements for a third portion of UI displays for logical devices for the same application 1, a fourth combined property file includes properties for UI elements for a fourth portion of UI displays for physical devices for the same application 1, and a fifth combined property file includes properties for UI elements for a fifth portion of UI displays for support for the same application 1.

Consistent with the property file naming convention described above, the occurrence of "APP" in the individual property file names may be expanded to allow for partitioning the property files for different UI elements associated with the foregoing 5 groupings of different UI displays. For example, an individual property file such as 720*a*-*n* may follow the following naming convention:

APP_NAVi_XX_YY_Vn.PROP where APP, XX, YY and Vn are as described above and NAVi represents one of the 5 UI navigational groupings described above, where "i" may be a value from 1 to 5 (e.g., NAV1 corresponds to host management 1102, NAV2 corresponds to provisioning 1104, NAV3 corresponds to logical devices 1106, NAV4 corresponds to physical devices 1108, and NAV5 corresponds to support 1110. In this manner as described elsewhere herein, a combination file may be generated that combines the set of individual property files for a defined grouping, such as a UI navigational grouping, for an application. In connection with this example, 5 combination files may be generated for application 1.

Figure 14:
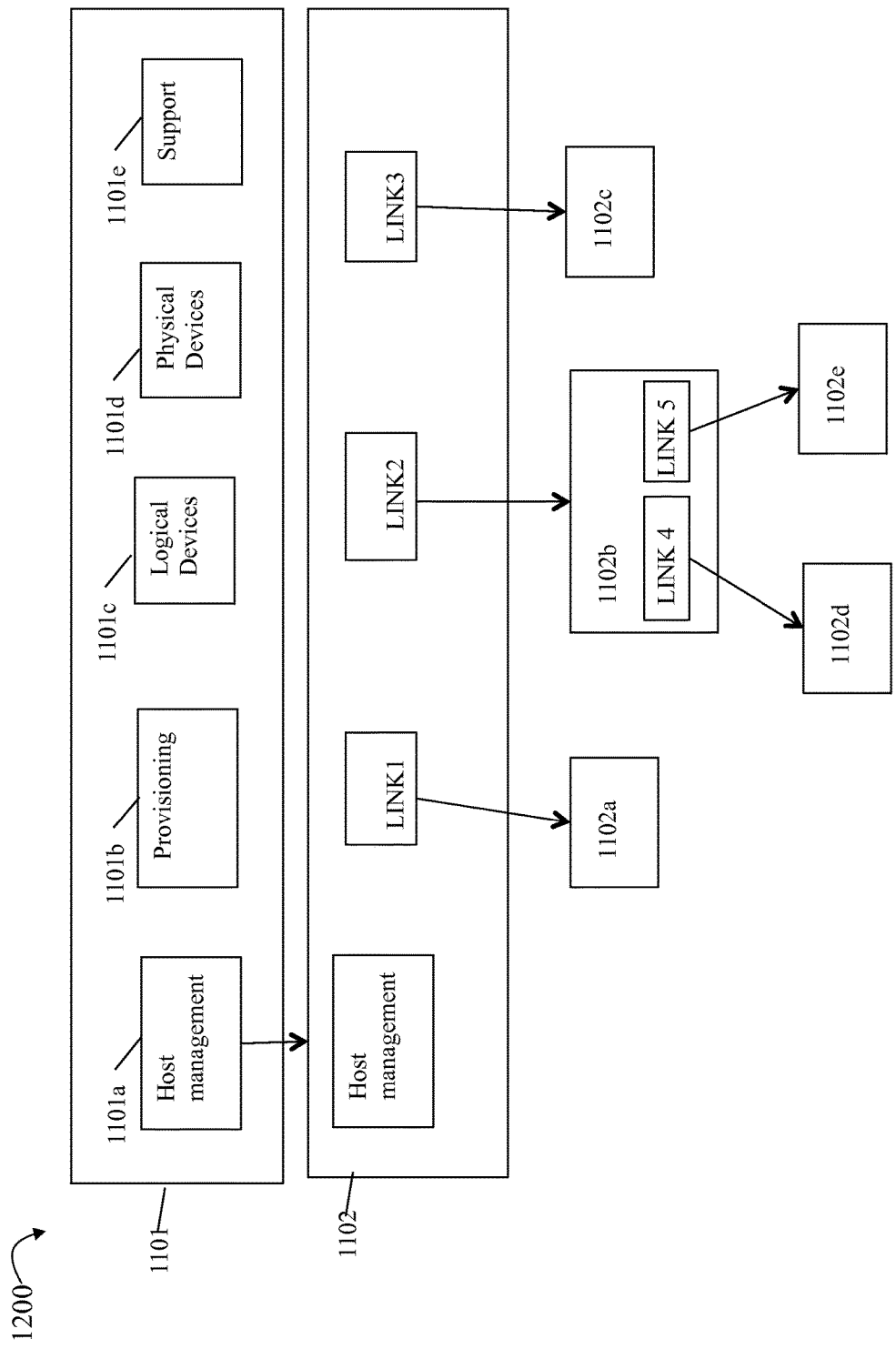

As yet another example with reference to FIGS. 12, 13 and 14, the UI code 114 of FIG. 12 may be executing and as a user navigates to particular pages or screens, the application code of the UI 114 may request particular property values from the look-up service triggering the loading of a particular combined property file on demand. For example, 5 combined property files corresponding to the 5 navigational groupings noted above (e.g., FIG. 13) may be generated and stored on a server for use by the lookup service 110. The lookup service 110, library 112, and code 114 may be included in a client such as the management system/computer executing the data storage management application. UI may be displayed by the UI application code 114 such as in response to a user selection. As described above in connection with rendering the UI display, the application code 114 performs an API call to code of a library 112 which performs a call to the look-up service 110 to determine one or more particular UI element property values. The lookup service 110 may request and load one or more property files on demand in response to a request from the code 114 (which is in effect responsive to a request for UI element property values needed to render a UI display). In this case, the property files (combined and/or individual) may be already in existence and loaded on demand into memory for use by the look-up service. For example, as a user navigates or selects a UI element associated with one of the 5 different navigational groupings, the combined property file for that particular navigational grouping may be loaded into memory of the lookup service for use. For example, a user may make a selection resulting in rendering a UI display of the host management grouping 1102. In response, the look-up service may load a first combined property file providing UI element property values for all UI displays in the grouping 1102. At a later point in time, the user may make a selection resulting in rendering a UI display of the logical devices grouping 1106. In response, the look-up service may unload or clear from its memory values stored for the first combined property file and may accordingly load a second combined property file providing UI element property values for all UI displays in the grouping 1106. In this manner, use of combined property files sent from the server to the client may result in a decrease in the number of individual calls or requests issued as opposed to requesting individual property files in separate requests.

As a variation to the foregoing, rather than have property files already in existence, one or more property files may be first generated on demand when such property files are needed for use by the look-up service and then secondly loaded on demand into memory for use by the lookup service. The application code of the UI 114 may request particular property values from the look-up service triggering not only the loading but also the generation of a particular combined property file. In other words, as just described, a UI navigation triggered loading property values from an existing combined property file, such as the first combined property file for host management 1102, on demand into memory for use by the lookup service 110. Additionally with this variation, the UI navigation may trigger on demand both the creation of the first combined property file and then also loading its property values on demand into memory for use by the lookup service 110.

It should be noted that an embodiment of the combination property file generator may perform other processing in addition to that as described above. The generator may also perform compression of the contents of the individual property files being combined. For example, the generator may remove blank lines, carriage returns, and the like, from the individual property files prior to the combined property file into the generated combined property file. The combination file generator may also further process the individual property files to determine particular property values for different properties based on the defined lookup chain specifying an ordered list in which the property files are read and processed by a look-up service. In other words, the generator may perform processing needed to resolve and determine a value for a particular property in connection with multiple individual property files referencing the same UI element's property such as described elsewhere herein. For example, the generator may perform processing as described in connection with FIG. 4 to determine a property value where multiple individual property files being combined reference the same UI element and property value. In this manner, the resolution processing performed to determine a final UI element property value may be performed by the generator rather than at runtime by the lookup service.

In connection with examples described herein and in connection with processing performed, such as by the look-up service 110 of FIGS. 3 and 12, the look-up chain may represent a prioritized ordering of property files whereby if two different property files both specify a different value for the same property, the value assigned to the property in the file that occurs the latest in the lookup chain is the final resulting property value. Thus, the value assigned to the property in the latest occurring file in the look-up chain overrides any previous value assignments for the same property. In this manner, the look-up chain may define a prioritized ordering of multiple property files whereby a second file that occurs after a first file in the ordering may have a higher priority in that any values for properties in the second file may override values for the same properties occurring in the first file. The foregoing describes a processing order in which the property files may be traversed in terms of increasing priority so that all property files are traversed. Rather than perform processing whereby all property files are traversed in the look-up chain in the foregoing increasing prioritized ordering, an embodiment may alternatively process the property files in the reverse ordering (e.g., from highest to lowest priority). If a value for a property is determined by traversing the property files in order from highest to lowest priority, processing may not require traversing all property files in that processing performed to determine a value for a particular property may stop as soon as a first property value assignment for the particular property has been located in one of the property files. It should be noted that this property file processing order from highest to lowest priority may be generally performed in connection with any examples as described herein although processing may also be performed in connection with processing property files from the lowest to the highest priority to determine a final property value.

Techniques described in following paragraphs may be used to provide a centralized location in a common property file where sizes or scaling factors may be specified whereby such sizes or scaling factors are used to determine UI element properties providing size dimensions for UI elements. The sizes or scaling factors may be specified in property files using key-value pairs as described elsewhere herein where a UI element property may be a key having an associated value used as the value for the UI element property. The sizes or scaling factors may be applied, for example, to sizes for specifying UI elements with respect to all dialogs, wizards, and the like, for a particular application (e.g., more generally for one or more specified code entities) for a particular language, such as English, German, French, Russian, and the like. Also a common property file may be specified for use with a set of code entities (e.g., such as all dialogs and wizards of a particular application) for a particular OEM, vendor, distributor or distribution chain, or other third party. It should be noted that notation is described elsewhere herein in connection with property file naming conventions where "Vn" may represent a portion of the property name for the particular OEM, distributor, vendor, distribution chain, third party, and the like.

The sizes or sizing factors specified in a common property file may be used, for example, when sizing windows, dialog boxes, text boxes, buttons or other UI elements including human readable description or text that may vary, for example, with any one or more of the particular spoken language, language dialect, OEM (original equipment manufacturer), vendor, distributor or distribution chain, and the like.

For example, for windows, dialog boxes, text boxes or other types of UI elements, it may be desirable to vary the size of the window, dialog box, or other UI element on a per language basis, such as English, Russian or another language. For example, an embodiment may change the size of a window, text box, or other UI element used for displaying text description for different languages. Also, an OEM or other third party may further change sizes of UI elements based on customization provided by the OEM or third party. For example, a text description in a first language may generally be 50% longer that when the same text description is written in a second language. Thus, a default or initial size factor of 1.0 may be used when sizing a dialog box in the second language and then a second suitable size factor of 1.5 may be selected when sizing the dialog box for the same description in the first language, whereby the second size factor selected may be determined relative to the default or initial size factor. Such sizes or size factors may be introduced on a per language basis in a common property file applicable for use with multiple code entities such as, for example, all dialogs and wizards of a particular application. Thus, a common property file may be used for resizing UI elements on a global scale for windows, dialog boxes or other UI elements for a particular application for a given language rather than specify sizes or size factors in multiple individual property files. Sizes or size factors may be expressed in any suitable manner using any suitable syntax. Some examples are used for illustration in following paragraphs and figures. An embodiment may specify a size using a size scaling factor relative to a numeric value. For example, a first common property file for an application, APP1, for the English language may be specified which specifies a height and width for a dialog box using numeric values. For example, the first English common property file may define variables HEIGHT1=400 (for 400 pixels or other units) and WIDTH1=550 (for 550 pixels or other units). A second common property file the same application APP1 for the French language may specify the height and width for the same dialog box when displaying text in French where the height may be specified using a relative size or scaling factor, such as 1.5. For example, the French common property file may specify HEIGHT2=1.5*HEIGHT1 and WIDTH2=1.5*WIDTH1. It should be noted that the scaling or size factor may be more than 1.0 (thereby resulting in a larger size relative to some initial or base value), or also less than 1.0, (thereby resulting in a reduced size relative to some initial or base value).

It should be noted that, consistent with description elsewhere herein, each of HEIGHT1, HEIGHT2, WIDTH1, and WIDTH2 may be a key for which a value is determined using the lookup service such as described in connection with FIG. 3. The lookup service may perform processing to evaluate each reference to a key. For example, in the statement "HEIGHT2=1.5*HEIGHT1", the lookup service performs processing to determine a value for the key HEIGHT1. In an embodiment as described herein, the value for a key may be a string and therefore the lookup service may determine a string of "400" as the value for the key HEIGHT1. In connection with the particular use or reference in the statement "HEIGHT2=1.5*HEIGHT1", the string "400" may be further converted to an appropriate type based on the context in which the key HEIGHT1 is referenced. In this particular example, the reference to HEIGHT1 is a mathematical formula or equation whereby the string "400" (determined as the value for the key HEIGHT1) may be further converted or interpreted as a numeric value, such as an integer or real value of 400. An embodiment may provide for automatically converting or interpreting the string value as a numeric quantity based on the context or usage in the statement. Alternatively, or in addition to any automatic type conversions based on usage, an embodiment may introduce additional syntax in the property file statements to explicitly denote how to interpret the string value of "400". For example, one embodiment may utilize syntax such as:

HEIGHT2=1.5*{HEIGHT1:PROPERTY} or
HEIGHT2=1.5*{HEIGHT1:NUMERIC} whereby the use of the curly braces (e.g., { }) causes the lookup service to perform formatting or type conversion of a value determined for the key HEIGHT1. The particular format or type to which the value is converted may be denoted by the use of PROPERTY or NUMERIC in the above exemplary syntaxes. The use of formatting and conversion using syntax such as noted above is described in more detail in following paragraphs in connection with format templates for keys As may be needed, an individual property file, such as may be customized for a particular dialog, wizard, or other code entity, may also override any size specified using the common property file. For example, a common property file for French applicable to all wizards, dialogs, and the like, for APP1 may be specified as described above. However, the specified size or scaling factor may not be applicable for use with a first dialog of APP1. As described in more detail below and elsewhere herein, a property file for the individual first dialog may be used to specify a different size or scaling factor for use with dialog boxes whereby the different size or scaling factor may override any size or scaling factor set using the common property file for French for APP1.

As described herein, a lookup chain may be defined denoting an order of precedence or priority of property files relative to one another. The lookup chain denoting the order of priority or precedence of the property files may be used in determining a value for a key corresponding to a property of a UI element. The lookup chain may define a property file priority ordering, such as from highest to lowest priority, where if the same key is assigned multiple values in two or more different property files, the property file having the highest priority in the lookup chain is used and may be characterized as overriding the other definitions for the key. The property files may be processed or traversed in an order, such as based on the highest to lowest priority in the lookup chain, so that processing performed to determine a value of a key may stop as soon as the first definition assigning a value to the key is determined.

An embodiment in accordance with techniques herein may include a set of one or more property files for each dialog, wizard, and the like (e.g., code entity), of an application. Thus, there may be a set of property files for each dialog or other code entity forming a lookup chain for determining a value of a property at runtime. There may be UI elements, types of UI elements (e.g., OK button), text descriptions, and the like, commonly used by multiple ones of the dialogs of the same application. For example, all OK buttons including the particular language dependent description "OK" in English may be commonly used with all dialogs of the application when displaying a UI in the US in English.

Rather than require repeatedly specifying the same common UI elements and same property values and/or common associated language specific description in each of the different property files used by the multiple dialogs, wizards or other code entities, such common UI elements and properties and/or common associated language specific descriptions (e.g., such as predefined strings) may be specified in a common property file. The common property file may be specified for a combination of any one or more of a particular application, such as APP1, a particular dialog, such as D1, a particular language, such as French, a particular country, such as France, a particular OEM or third party, and the like. A common property file may have different suitable variations in scope in an embodiment besides that just described. The common property file is described in more detail in following paragraphs and may generally follow a naming convention and provide for variations with respect to application, dialog, language, country, and OEM or third party as described elsewhere herein with other property files.

In one embodiment using object oriented programming techniques with classes, definitions of the common property file may be specified as a base class for use with a set of property files. An individual property file may then have a second class that extends the base class whereby the second class includes the definitions (e.g., functions, variables, etc.) of the base class (e.g., common property file) along with any additional definitions of the second class. The second class may also include definitions that override an existing definition in the base class. The second class may be characterized as inheriting features of the first base class.

Thus, an embodiment in accordance with techniques herein may have a set of property files provided for an application where the set includes individual non-common property files consistent with description elsewhere herein. Each individual non-common property file of an application, such as for a particular dialog or wizard of the application, may then, for example, import the common properties. The particular mechanism used to import or incorporate the common property file definitions into another property file may vary with the way in which the property files and associated definitions are implemented. In this manner, a set of common property definitions may be provided for use with multiple other individual property files whereby such an individual non-common property file may, as needed, override an existing property definition specified in the common property file.

As described herein, properties may be specified using key-value pairs where a particular key may denote a property. More generally, a property file may use key-value pairs to assign a value to a "key" where the key may denote, for example, a property of a UI element or generally a value used for other purposes. Code, such as included in a dialog of an application, may then reference the key where a lookup is performed to determine its current value within the dialog. Lookup processing performed to determine the value for the referenced key is described elsewhere herein.

For example, property files may be used to parameterize referenced text descriptions such as included on UI elements, like buttons. For example, a UI element may be a button that includes a text description relating to functionality of the button. A UI display may include a button selected to proceed with an operation. In English, the button may be labeled with the text string "OK". In French, the same button in the UI display may be labeled with the text string "OUI". A key, OKSTRING, may be defined which is assigned a different value depending on the language. A French property file may define a key-value of OKSTRING="OUI" and an English property file may define a key value pair for the same key as OKSTRING="OK". The dialog code may be written in a language independent manner to reference the key OKSTRING where a value for OKSTRING may be returned at runtime to the dialog code. Consistent with description elsewhere herein, the English property file may be used with the dialog when in the United States so that the key OKSTRING has the value "OK" as determined by the runtime lookup processing. The French property file may be used with the dialog when in France so that the key OKSTRING will alternatively have the value "OUI" as determined by the runtime lookup processing.

An embodiment may also implement property files with additional functionality. For example, one embodiment may provide formatting function for use within a property file. The format functionality may be used with a key having a template specified for the key value. The template is evaluated when determining the actual value of the key. The template may optionally have one or more parameters.

For example, a key may be defined as a format template with one or more arguments or parameters having the general form of:
key=format template
The format template may have a general form of:
optional string {param 0 format} optional string [{param n format} optional string] . . .
where
optional string indicates that a string may be optionally specified;

{param 0 format} is the format for parameter 0 and generally, {param n format} refers to the format descriptor for parameter n, n being greater than zero and where there are "n+1" parameters in the template; and

[{param n format}] optional string] denotes 0 or more occurrences of the items enclosed within the brackets [ ] depending on the number of parameters.

Each parameter format descriptor (e.g., {param n format}) denoted by the curly braces { }, may have a general form of:

{param_num: format_type: format_specific} where, for each format descriptor:

param_num is required and denotes one of the parameters;

format_type is optional and may denote a predefined format type; and format_specific is optional and denotes a format attribute, action, or operation, specific to the indicated format_type.

It should be noted that an embodiment may include any suitable format_types and associated format_specific attributes or operations.

As a further example, consider the following:
HEIGHT={0: math: *1} where the key is HEIGHT and the template contains a single format descriptor for a single parameter 0 where the format descriptor is {0:math: * 1}. The format descriptor for "parameter 0" (e.g., denoted by the "0" in the descriptor) has a format_type of "math" indicating that "parameter 0" is to be used in a mathematical expression or calculation as specified by the format_specific item of "*1" indicating to multiply parameter 0 by the integer 1. Thus, parameter 0 is multiplied by 1 (e.g., *1) to determine the value for the key HEIGHT.

Code of the dialog or other code entity may perform a runtime call referencing the key HEIGHT causing lookup processing to be performed using the appropriate look-up chain to resolve and determine a value for HEIGHT.

For example, code of the dialog may include the following:
hgt=resolve ("HEIGHT", 400)

which triggers runtime processing using the lookup chain described herein (e.g., such as performed by the lookup service of FIG. 3) to determine a value for HEIGHT which is assigned to the variable "hgt" in the dialog code. In this case, the template "HEIGHT={0: math: *1}" specified as the value for HEIGHT is evaluated to determine a value of 400 for HEIGHT which is assigned to the variable hgt in the dialog code.

Consistent with other description herein for key value pairs, the template, or more generally the value, specified for a particular key, such as HEIGHT, may also be redefined or overridden. This, as well as used of the formatting template are described in more detail in following paragraphs in connection with use of specifying sizes such as for dialog boxes and other UI elements.

In following paragraphs, property file names may include an abbreviated name for simplicity in illustration. For example, the property file name may omit portions associated with an application name (e.g., the APP portion of the file name), OEM or distributor (e.g., the Vn portion of the file name), and the like. However, property file names may follow any of the different property file naming conventions as described herein as well as other suitable variations.

In connection with determining a value for key-value pairs such as used in connection with determining property values for UI elements (e.g., such as the HEIGHT and WIDTH keys used for sizing dialog and text boxes used with dialogs and wizards of an application), an embodiment may use techniques described herein and those which are described, for example, in U.S. application Ser. No. 14/035,664 (pending), filed on even date herewith, INHERITANCE OF PROPERTIES FILES WITH LOCALE CHAIN SUPPORT," Scott E. Joyce et al., which is incorporated by reference herein.

Figure 15:
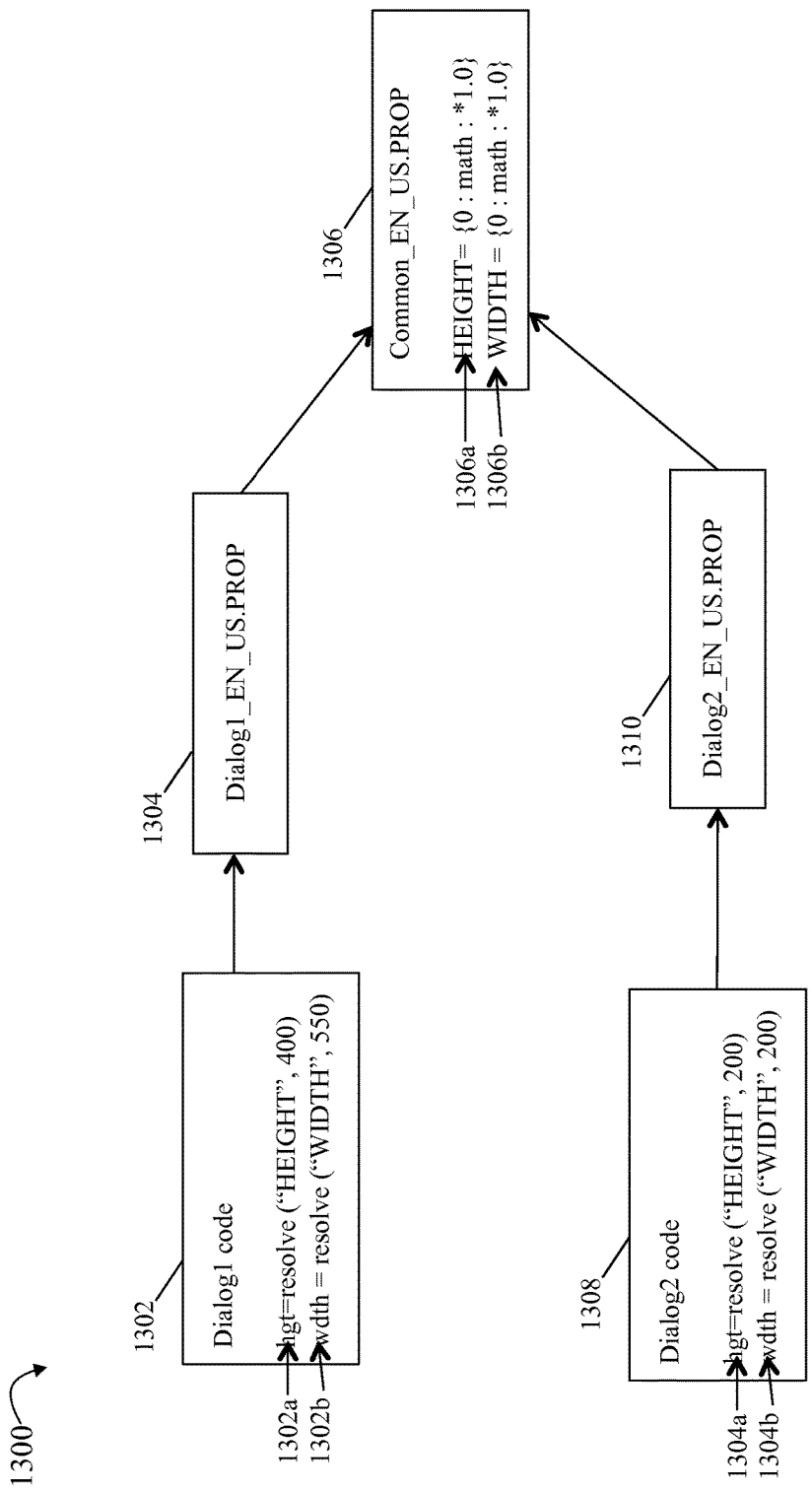
FIGS. 15, 16, 17, 18, and 19 are examples illustrating use of techniques herein with property files including common property files in an embodiment in accordance with techniques herein.

Referring to FIG. 15, shown is an example of an embodiment illustrating use of techniques herein. The example 1300 includes code of a first dialog, dialog1 1302, and code of a second dialog, dialog2, 1308. Both dialog1 and dialog2 may be dialogues, wizards, or more generally code entities of the same application executed to render various UI elements for dialogs, wizards, and the like. For each dialog, a set of one or more property files may be specified. For simplicity of illustration in this example, assume that a single dialog specific property file is provided for each dialog which includes the properties for the country of the US and the language of English (EN). Thus, property files 1304 and 1310 may be provided. Additionally, a common property file, common_EN_US.PROP 1306, may be provided which includes key value pairs used in specifying property definitions common to both dialog1 1302 and dialog2 1308. The common property file 1306 may include values for the keys HEIGHT and WIDTH used in specifying height and width properties of dialog or text boxes displayed in a UI in the US in English. Element 1306a specifies a value for the key HEIGHT using a template with a format descriptor as described elsewhere herein. Element 1306b specifies a value for the key WIDTH using a template with a format descriptor as described elsewhere herein.

Dialog1 code 1302 may include statement 1302a which triggers runtime processing using the predefined property file lookup chains to determine the value for the key HEIGHT where the resulting value is assigned to the variable hgt. Dialog1 code 1302 may include statement 1302b which triggers runtime processing using the predefined property file lookup chains to determine the value for the key WIDTH where the resulting value is assigned to the variable wdth.

Similarly, dialog2 code 1304 may include statements 1304a, 1304b which trigger runtime processing using the predefined property file lookup chains to determine the values, respectively, for the key HEIGHT where the resulting value is assigned to the variable hgt, and for the key WIDTH where the resulting value is assigned to the variable wdth.

In this example, the lookup service, such as described in connection with FIG. 3 and/or FIG. 12, may perform processing as described elsewhere herein to chain together the different property files and determine a value for keys based on a predetermined precedence or ordering of the property files. Additionally, the processing may also now incorporate key-value pairs and definitions specified in the common property file 1306. In one embodiment, each of the property files 1304 and 1310 may import the key-value pairs from the common property file 1306 whereby the key-value pairs from 1306 may be overridden by any redefinition in the individual dialog property files 1304 and 1310.

In this example, line 1306a of common property file 1306 specifies a definition for HEIGHT which is not further redefined or overridden in any of the property files 1304 and 1310 so the definition specified by 1306a is used for the key HEIGHT in both dialog1 1302 and dialog 2 1308. Execution of statement 1302a of dialog1 1302 uses 1306a to determine a value of 400 for HEIGHT. In connection with determining a value for HEIGHT as a result of resolution or lookup processing performed for 1302a, element 1306a indicates that parameter 0 in the template for HEIGHT has a value of 400 which is multiplied by 1.0 resulting in 400. Execution of statement 1304a of dialog2 1308 uses 1306a to determine a value of 200 for HEIGHT. In connection with determining a value for HEIGHT as a result of resolution or lookup processing performed for 1304a, element 1306a indicates that parameter 0 in the template for HEIGHT has a value of 200 which is multiplied by 1.0 resulting in 200.

Line 1306b of common property file 1306 specifies a definition for WIDTH which is not further redefined or overridden in any of the property files 1304 and 1310 so the definition specified by 1306b is used for the key WIDTH in both dialog1 1302 and dialog 2 1308. Execution of statement 1302b of dialog1 1302 uses 1306b to determine a value of 550 for WIDTH. In connection with determining a value for WIDTH as a result of resolution or lookup processing performed for 1302b, element 1306b indicates that parameter 0 in the template for WIDTH has a value of 550 which is multiplied by 1.0 resulting in 550. Execution of statement 1304b of dialog2 1308 uses 1306b to determine a value of 200 for WIDTH. In connection with determining a value for WIDTH as a result of resolution or lookup processing performed for 1304b, element 1306b indicates that parameter 0 in the template for WIDTH has a value of 200 which is multiplied by 1.0 resulting in 200.

In this manner, the key values HEIGHT and WIDTH in the common property file 1306 may denote sizes for all dialog and wizard UI elements such as for all dialog boxes or text boxes for all dialogs and wizards of an application. If needed, the key values HEIGHT and WIDTH related to such sizes for the dialog and text boxes may be modified to thereby resize all dialog and text boxes for all dialogs and wizards of the application.

Figure 16:
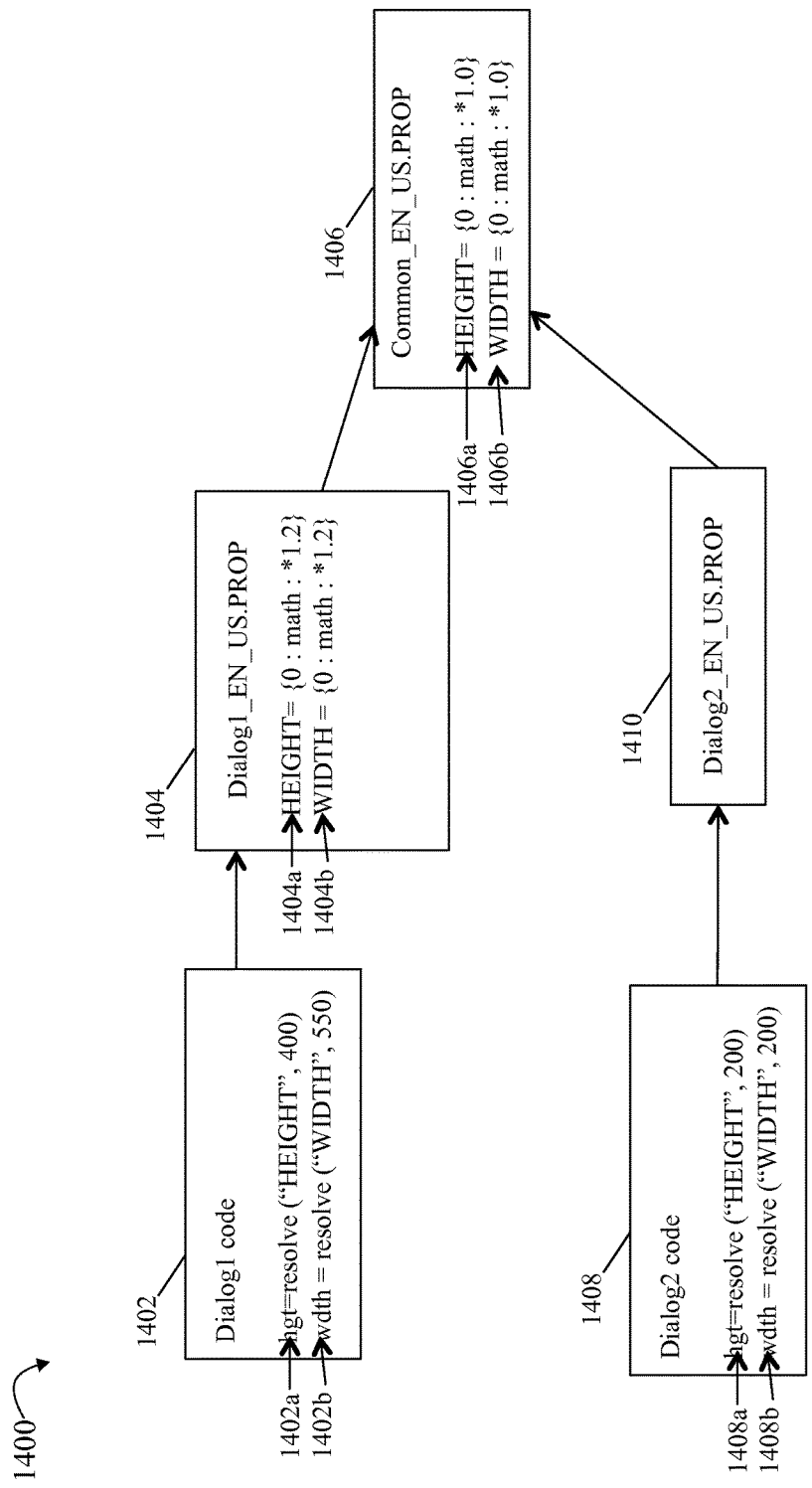

Referring to FIG. 16, shown is a second example of an embodiment illustrating use of techniques herein. In the example 1400, the code for dialog 1 1402, code the dialog 2 1408, common property file 1406 and dialog2 property file 1410 may be as described above in connection with FIG. 15. In this example, dialog1's property files 1404, dialog1_EN_US.PROP, includes key value pairs 1404a and 1404b providing new or revised definitions for keys HEIGHT and WIDTH. In other words, the definition for key HEIGHT of 1404a in the dialog1 property file 1404 overrides the definition for key HEIGHT of 1406a in the common property file 1406. Similarly, the definition for key WIDTH of 1404b in the dialog1 property file 1404 overrides the definition for key WIDTH of 1406b in the common property file 1406. As described with FIG. 15, the lookup service only uses property files for the US with an English language client/dialog UI. Using the predefined lookup chains of property files for runtime resolution in connection with statement 1402a of dialog 1 1402, the definition 1404a of property file 1404 is used and a value of 400*1.2=480 is determined for HEIGHT. Using the predefined lookup chains of property files for runtime resolution in connection with statement 1402b of dialog 1 1402, the definition 1404b of property file 1404 is used and a value of 550*1.2=660 is determined for WIDTH. In this second example, evaluation of 1404a and 1404b are as described in connection with FIG. 15.

In the example 1400, the lookup order used by the lookup service in determining key values for dialog1 code 1402 is dialog1 property file EN_US 1404 followed by common property file EN_US 1406. The lookup order used by the lookup service in determining key values for dialog2 code 1404 is dialog2 property file EN_US 1410 followed by common property file EN_US 1406.

Figure 17:
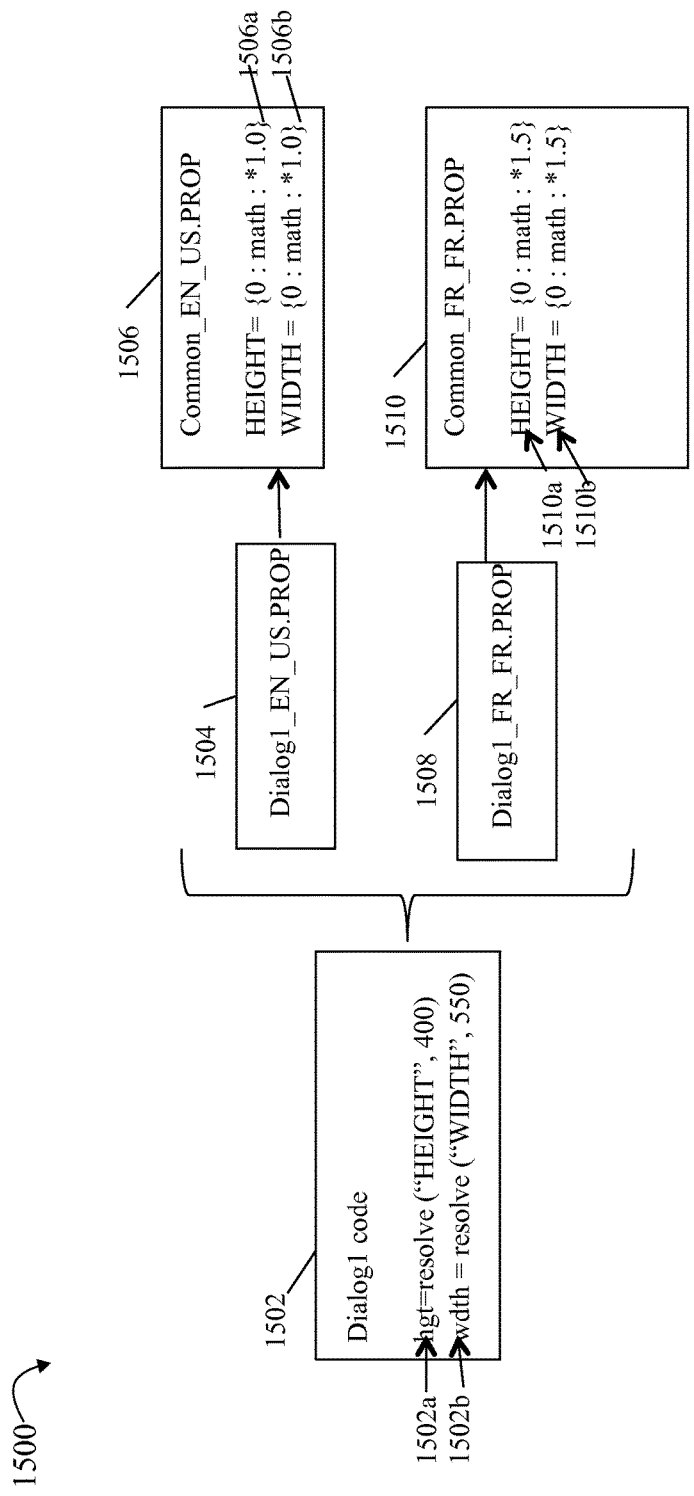

Referring to FIG. 17, shown is a third example of an embodiment illustrating use of techniques herein. Dialog1 code 1502, dialog1 EN_US specific property file 1504 (e.g. country=US and language=ENglish), and common property file for EN_US 1506 are respectively analogous to elements 1302, 1304 and 1306 of FIG. 15. Additionally, the example 1500 includes a dialog1 specific property file 1508 for the country France and the language French as denoted by the FR_FR dialog file naming convention. The example 1500 also includes a second common property file 1510 for FR_FR.

In a manner similar to that as described herein with the EN_US common property file 1506, an embodiment may also specify one or more other common property files having different scoping as described herein. In this example, the FR_FR common property file 1510 may provide common key values that may vary with the particular combination of country and language. For example, it may be that descriptions in French are generally 50% longer than the same description in English. In this case, an embodiment may apply a size or scaling factor such as 1.5 or 150% for both the HEIGHT and WIDTH keys as indicated in the common property file FR_FR 1510 where the HEIGHT and WIDTH keys are used to determine sizes of dialog boxes displayed in connection with dialog1 1502. It should be noted that the size or scaling factors of 1.5 specified in the common property file FR_FR 1510 for the HEIGHT and WIDTH keys are relative to the size or scaling factor of 1.0 or 100% for the HEIGHT and WIDTH keys as indicated in the common property file EN_US 1506.

In the example 1500, assume that dialog1 1502 is executing in France with a French language GUI and statement 1502a is executed to lookup and resolve a value for the key HEIGHT. For this case, the property files of 1500 of the lookup chain which are traversed have the extension FR_FR and EN_US. Consistent with description elsewhere herein, processing may first look for file dialog1_FR_FR.PROP 1508 and see if it contains a definition for the key HEIGHT. In this case, there is no definition for HEIGHT. Since there is no definition in the property file 1508, processing then proceeds with dialog1_EN_US.PROP 1504 where it is determined that there is no definition for HEIGHT. Since there is no definition in the property file 1504, processing proceeds with the common property file common_FR_FR.PROP 1510 where it is determined that the common FR_FR property file 1510 provides a base class definition for HEIGHT as indicated in 1510a. It should be noted that if there is no definition in common_FR_FR.PROP 1510, processing would use the definition for HEIGHT as provided in 1506a of common_EN_US.PROP 1506.

In a similar manner to that just described for statement 1502, processing for statement 1502b of dialog1 code 1502 using the foregoing lookup chain resolves to using the key-value pair definition of 1510b in common_FR_FR.PROP 1510 for the key WIDTH.

For the example 1500, the lookup chain or order used by the lookup service in determining key values for dialog1 code 1502 may be expressed as: dialog1 property file FR_FR 1508, dialog1 property file EN_US 1504, common property file FR_FR 1510, followed by common property file EN_US 1506. In connection with supporting inheritance and common property files, the look-up chain may have an ordering in which the common property files (e.g., 1510, 1506) are generally traversed last in the lookup chain providing a common default value for a key if no value has otherwise been specified in a dialog specific property file (e.g., no value for the key specified in 1508 or 1504).

In the example 1500, based on the foregoing lookup chain or order used when executing dialog1 1502 in France with a French language GUI, execution of 1502a may result in using definition 1510a and determining a value of 600 for the key HEIGHT (e.g., parameter 0 is 400 which evaluates to 1.5*400=600). Additionally, based on the foregoing lookup chain or order used when executing dialog1 1502 in France with a French language GUI, execution of 1502b may result in using definition 1510b and determining a value of 825 for the key WIDTH (e.g., parameter 0 is 550 which evaluates to 1.5*550=825).

As a variation, assume that dialog1 1502 is executing in the US with the English language GUI thereby using the property files with the extension EN_US but not FR_FR. In this case, the lookup chain or order used by the lookup service in determining key values for dialog1 code 1502 may be: dialog1 property file EN_US 1504 followed by common property file EN_US 1506. Based on the foregoing lookup chain or order used when executing dialog1 1502 in the US with an English language GUI, execution of 1502a may result in using definition 1506a and determining a value of 400 for the key HEIGHT (e.g., parameter 0 is 400 which evaluates to 1.0*400=400). Additionally, based on the foregoing lookup chain or order used when executing dialog1 1502 in the US with the English GUI, execution of 1502b may result in using definition 1506b and determining a value of 550 for the key WIDTH (e.g., parameter 0 is 550 which evaluates to 1.0*550=550).

Figure 18:
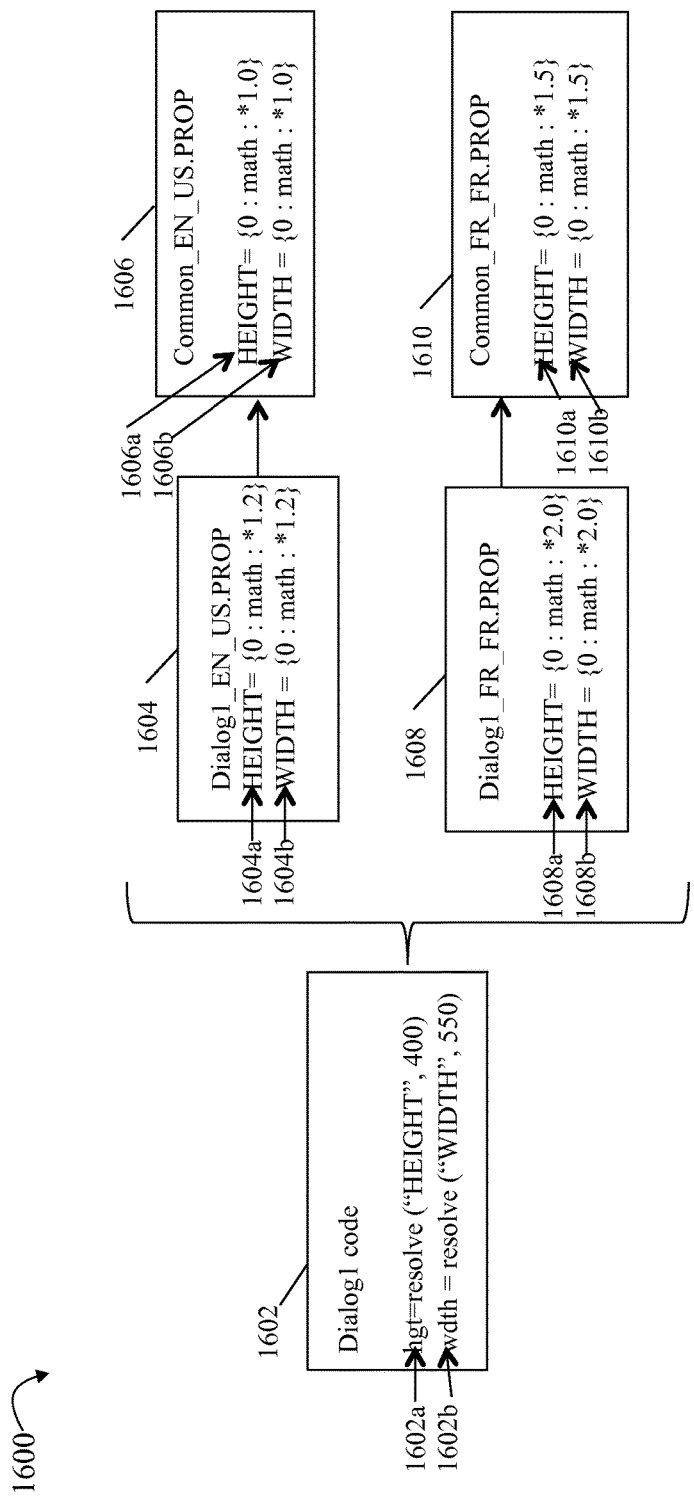

Referring to FIG. 18, shown is a fourth example of an embodiment illustrating use of techniques herein. Elements 1602, 1606 and 1610 are respectively similar to elements 1502, 1506 and 1510 of FIG. 17.

The dialog1 FR_FR property file 1608 has been modified from that represented by 1508 illustrated in FIG. 17 to include key-value pairs 1608a and 1608b. In this case, element 1608a specifies a key-value pair definition for HEIGHT which overrides 1610a, the definition and value for HEIGHT in the common FR_FR property file 1610. Similarly, element 1608b specifies a key-value pair definition for WIDTH which overrides 1610b the definition and value for WIDTH in the common FR_FR property file 1610.

In the example 1600, based on the lookup chain or order discussed above (e.g., with FIG. 17) when executing dialog1 1602 in France with a French language GUI, execution of 1602a may result in using definition 1608a and determining a value of 800 for the key HEIGHT (e.g., parameter 0 is 400 which evaluates to 2.0*400=800). Additionally, execution of 1602b may result in using definition 1608b and determining a value of 1100 for the key WIDTH (e.g., parameter 0 is 550 which evaluates to 2.0*550=1100).

Additionally, the dialog1_EN_US property file 1604 has been modified from that represented by 1504 illustrated in FIG. 17 to include key-value pairs 1604a and 1604b. In this case, element 1604a specifies a key-value pair definition for HEIGHT which overrides any definition for HEIGHT provided in 1610 and 1606. Similarly, element 1608b specifies a key-value pair definition for WIDTH which overrides the definitions for WIDTH specified in 1610 and 1606.

In the example 1600, based on the lookup chain or order discussed above (e.g., with FIG. 17) when executing dialog1 1602 in the US with an English language GUI (thereby only being concerned with EN_US property files), execution of 1602a may result in using definition 1604a and determining a value of 480 for the key HEIGHT (e.g., parameter 0 is 400 which evaluates to 1.2*400=480). Additionally, execution of 1602b may result in using definition 1604b and determining a value of 660 for the key WIDTH (e.g., parameter 0 is 550 which evaluates to 1.2*550=660).

Figure 19:
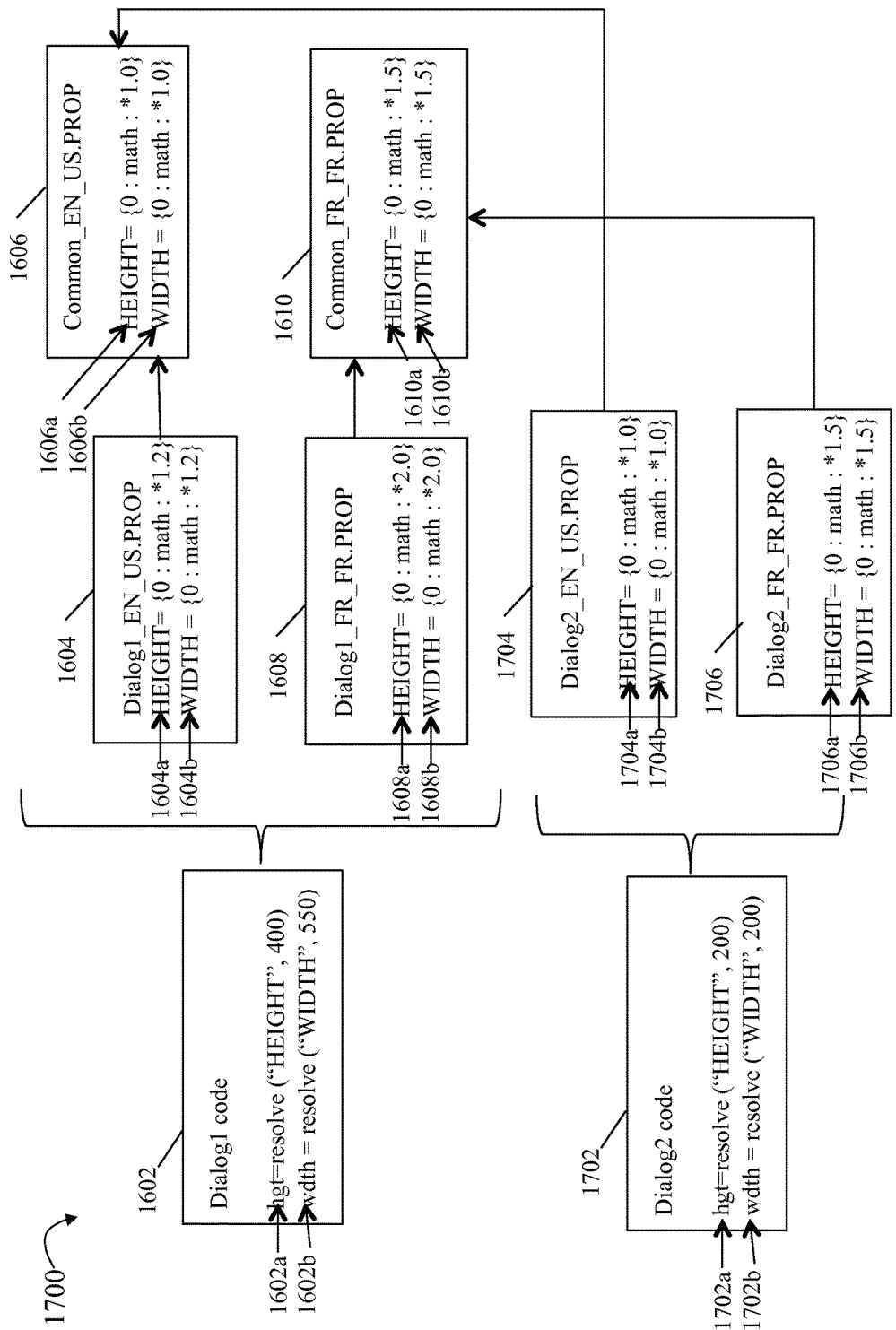

Referring to FIG. 19, shown is a fifth example of an embodiment illustrating use of techniques herein. Elements 1602, 1604, 1606, 1608, and 1610 are respectively similar to elements similarly numbered in FIG. 18. Additionally, the example 1700 includes dialog2 code 1702, dialog2 specific property file EN_US 1704 and dialog2 specific property file FR_FR 1706. When executing dialog1 1602 in the US with an English language GUI or in France with a French language GUI, the values for HEIGHT and WIDTH may be determined as described above in connection with FIG. 18.

When executing dialog2 1702 in France with a French language GUI, 1706a and 1706b of the Dialog2 FR_FR property file 1706 may be used whereby a value of 300 is determined for HEIGHT and a value of 300 is determined for WIDTH. When executing dialog2 1702 in the US with an English language GUI, 1704a and 1704b of the Dialog2 EN_US property file 1704 may be used whereby a value of 200 is determined for HEIGHT and a value of 200 is determined for WIDTH.

The example 1700 is generally illustrating use of multiple property files with multiple dialogs of the same application.

An embodiment in accordance with techniques herein may use the common property file to specify values for different keys, such as the HEIGHT and/or WIDTH, whereby such values are used for UI element properties and may then be applied on a global basis for use with every other property file, such as multiple dialog specific property files, which imports or otherwise incorporates the common definitions for the keys in the common property file. As described herein, the keys may be used to specify different values for properties of various types of UI elements, such as sizes related to windows, dialog or text boxes displayed for one or more wizards, dialogues, and the like, of one or more applications. As described herein, a hierarchy or predefined lookup chain denoting a prioritized list of the property files may be used to further provide for overriding common definitions in one or more dialog-specific property files. Such overriding may provide for further customization of the keys used for different UI element properties, such as the HEIGHT and WIDTH keys. In an embodiment, the common property file may be used, for example, to provide default globally specified values for UI element properties of a particular type of UI element (e.g., size of windows for all dialogs, wizards, the like of an application).

Thus, techniques herein may use the predefined lookup chain including one or more common property files providing a base or initial level of definitions for key-value pairs providing values for different UI element properties. Such base definitions may be included in one or more base classes that may be extended by dialog specific property files thereby providing values to override key definitions that may be provided in the common property files.

The sizes specified for HEIGHT and WIDTH (such as described herein using keys in the property file(s)) may be used by code of an application, such as the dialog code described herein, to determine a size of a type of UI container, component, view port or window of the UI display. For example, as described herein, HEIGHT and WIDTH may be used to specify dimensions of a pop-up window for each dialog of an application whereby the window may be characterized as the outermost UI element for the dialog in which text and other child UI elements or components are contained. This is illustrated with reference now to FIG. 20 and example 1800.

Figure 20:
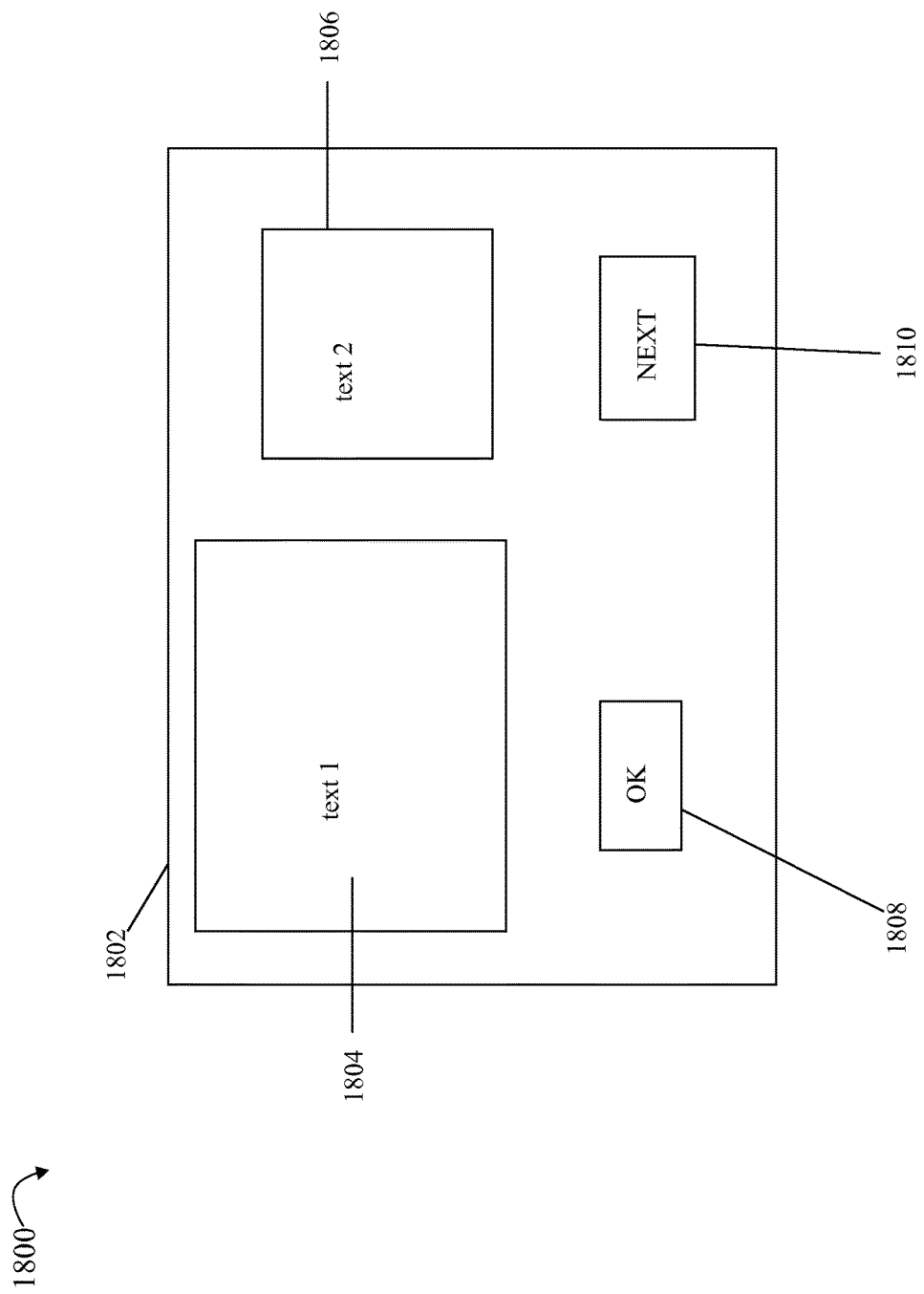
FIG. 20 is an example of user interface and various elements that may have property values determined in accordance with techniques herein.

In the example 1800 of FIG. 20, values specified using the HEIGHT and WIDTH keys such as described herein may be used to specify the size or dimensional properties of 1802. Element 1802 may represent the outermost UI element, such as a window, which is displayed for an executing dialog or wizard. As the dialog executes, additional child UI elements or components, such as 1804, 1806, 1808, and 1810, may be further displayed within the outermost UI element 1802. In the example 1800, elements 1804 and 1806 may be text boxes, and 1808 and 1810 may be buttons selected to perform action responsive to their respective selections. In one embodiment, the outermost UI element of the dialog or wizard may be specified using absolute sizes, such as expressed herein using numeric values (e.g., dialog 1 code and dialog2 code in FIGS. 15-19). Sizing of other child UI elements within the parent UI element 1802 may be performed using relative sizing or positioning as well as any suitable technique. UI elements 1804 and 1806 may be specified, for example, using relative sizes such as in terms of percentages of the parent UI element 1802. To further illustrate, UI element 1804 may have a size, such as its height property, expressed in terms of a percentage relative to the size of 1802, such as 50% thereby indicating to make 1804 have a height which is 50% of the height of 1802. With relative sizing used for child UI elements 1804, 1806, 1808 and 1810 and absolute size dimensions for height and width used for the outermost parent UI element 1802, the child UI elements 1804, 1806, 1808 and 1810 may be automatically resized to maintain the relative sizing as a percentage of the outermost parent UI element 1802.

Thus, one use of techniques herein with the common property file, such as element 1306 of FIG. 15, may be to specify the HEIGHT and WIDTH key values used as UI element properties that define the dimensions of the outermost UI element for every dialog or wizard for an application. In the event it is desirable to change the dimensions, the dimensions may be modified for all dialogs and wizards of the application by simply modifying the values in the common_EN_US.PROP file 1306 of FIG. 15 (assuming that property files 1304, 1310 do not include definitions for the HEIGHT and WIDTH keys thereby overriding definitions in the common property file 1306).

More generally, techniques herein may be used to specify size dimensions for other UI elements or components for the dialogs and wizards of the application. For example, techniques herein may be used to specify size dimensions for child UI elements such as any one or more of 1804, 1806, 1808 and/or 1810 whereby such sizes may be expressed using absolute values, relative sizes (e.g., such as percentages described above relative to the outermost UI element), or any other suitable manner in which sizes may be expressed in an embodiment.

For example, techniques herein may be used to specify any size dimension property for a UI element that is any of the following types of UI elements: a window, a menu, a menu bar, a menu item, a text box, a button, a navigation section including one or more hyperlinks, a hyperlink, a table, a drop-down list, a list box, a check box, a dialog box, a wizard, and a combo box.

Furthermore, techniques herein may generally be used with properties related to size as well as other properties of a UI element. For example, techniques herein may be used to specify a property that is relates to any of a text size, a color, a physical dimension, a height, a width, and a location or placement of a UI element when rendered in a UI display. It should be noted that in connection with a color, the property value may be a numeric value denoting an intensity of a color, a numeric value denoting a mixture or shading of one or more colors, and the like.

To further illustrate, techniques herein may be used to specify a size for a particular type, class or category of UI elements, such as all buttons, all child text boxes, particular types of buttons (e.g., such as all OK buttons, all CONTINUE or NEXT buttons), and the like. To further illustrate, an embodiment may specify size dimensions used for all OK buttons of an application (e.g., with respect to all dialogs, wizards, and the like, comprising an application). In a manner similar to that as described herein for HEIGHT and WIDTH keys for the outermost UI element for a wizard or dialog, keys may be defined having values used to specify the size properties of OK buttons in the application UI. For example, with reference to FIG. 17, an embodiment may specify key values in the common EN_US property file 1506 for all OK buttons of an application:

OK_BUTTON_WIDTH={0: math: *1.0}
OK_BUTTON_HEIGHT={0: math: *1.0} and may specify key values in the common FR_FR property file 1510 for all OK buttons of an application:

OK_BUTTON_WIDTH={0: math: *1.3}
OK_BUTTON_HEIGHT={0: math: *1.3}

Dialog1 code 1502 may include statements similar to 1502a, 1502b to perform processing in accordance with the predefined property file lookup chain as follows:

ok_button_width=resolve ("OK_BUTTON_WIDTH", 50)
ok_button_height=resolve ("OK_BUTTON_HEIGHT", 50)

The foregoing statements may be used to determine values for the keys OK_BUTTON_WIDTH and OK_BUTTON_HEIGHT where such values are assigned to appropriate button UI element properties denoting the width and height size dimensions for an OK button created on the UI display, such as 1808 of FIG. 20.

As an alternative to using absolute values of 50 in the above-mentioned statements, relative sizing may be used. For example, dialog1 code 1502 may include statements:

ok_button_width=resolve ("OK_BUTTON_WIDTH", 5%)
ok_button_height=resolve ("OK_BUTTON_HEIGHT", 5%)

where each occurrence of 5% denotes a size of 5% of the outermost UI element, such as window 1802 of FIG. 20. Using techniques herein, the relative size of 5% may also be varied based on the particular key definition and property file selected for use in accordance with the property file lookup chain.

Techniques herein may also be further extended for use with property files of a lookup chain including OEM, distributor, or other third party provided property files. Consistent with description elsewhere herein, a property file naming convention may have the following general pattern:

APP_Dm_XX_YY_Vn.PROP where

APP may denote a number of one or more characters associated with identifying a particular application, Dm may denote a number of one or more characters identifying a particular code entity, such as a dialog or wizard, of the designated application APP, XX is a two letter coding denoting a particular language, YY is a two letter coding denoting a particular country, and Vn denotes property files provided by a particular vendor, OEM, distributor, third party, and the like, denoted by "n". In connection with Vn as described elsewhere herein, "n" may be an integer such as greater than zero and each vendor, OEM, etc., may be uniquely identified using a different integer value for "n".

The property files may form a lookup chain denoting a prioritized ordering of the property files to support different languages and also the OEM or other third party that may distribute property files. Without use of common property files (and therefore without using other property files which extend any base class or base definitions provided in common property files), the following property files may be provided, for example, for dialog1 (D1) of application 1 (APP1) for an OEM denoted V1:

APP1_D1_FR_FR_V1 /*OEM French property file */
APP1_D1_FR_FR /* original French property file provided with UI such as by original provider of the system or UI */
APP1_D1_EN_US_V1 /* OEM English property file */
APP1_D1_EN_US /* original English property file provided with UI such as by original provider of the system or UI */

Given the above, the following may be the lookup chain or prioritized ordering from highest to lowest (e.g., the order in which the property files may be searched) used to determine a value for a key:

APP1_D1_FR_FR_V1 /*OEM French property file */
APP1_D1_FR_FR /* original French property file provided with UI such as by original provider of the system or UI */
APP1_D1_EN_US_V1 /* OEM English property file */
APP1_D1_EN_US /* original English property file provided with UI such as by original provider of the system or UI */

Processing to determine a value for a key may, for example, traverse the property files in the lookup chain in order from highest to lowest priority and then use the first definition for the key located in the files.

An embodiment may also use common property files providing base classes or definitions which are extended by the other non-common property files. Each non-common property file (e.g., the 4 files noted above) may, for example, import the definitions from a common property file to thereby extend the base class definitions provided in the common property file. In this case, the following may be the lookup chain or prioritized order, from highest to lowest, in which the property files are searched to determine a value for a key whereby processing uses the first definition for the key located in the files when traversed in the following order:

APP1_D1_FR_FR_V1 /*OEM French property file */
APP1_D1_FR_FR /* original French property file provided with UI such as by original provider of the system or UI */
APP1_D1_EN_US_V1 /* OEM English property file */
APP1_D1_EN_US /* original English property file provided with UI such as by original provider of the system or UI */
Common_FR_FR_V1 /* OEM common French property file */
Common_FR_FR /* original common English property file provided with UI such as by original provider of the system or UI */
Common_EN_US_V1 /* OEM Common English property file */
Common_EN_US /* original common English property file provided with UI such as by original provider of the system or UI */

It should be noted that any file in the foregoing chain may be missing or omitted so that not all files are required to be in existence. However, for all property files that are provided, they may be traversed so that the foregoing lookup chain provides the order of precedence or priority when determining a value for a key having multiple definitions. Only one instance of a key definition is needed in the chain of property files, such as by default in Common_EN_US or APP1_D1_EN_US whereby such definitions may be overridden at one or more levels higher in the foregoing chain. Also, based on the foregoing lookup chain:

the property file APP1_D1_FR_FR_V1 may import and thus extend the base class of definitions of Common_FR_FR_V1;
the property file APP1_D1_FR_FR may import and thus extend the base class of definitions of Common_FR_FR;
the property file APP1_D1_EN_US_V1 may import and thus extend the base class of definitions of Common_EN_US_V1; and
the property file APP1_D1_EN_US may import and thus extend the base class of definitions of Common_EN_US.

Figure 21:
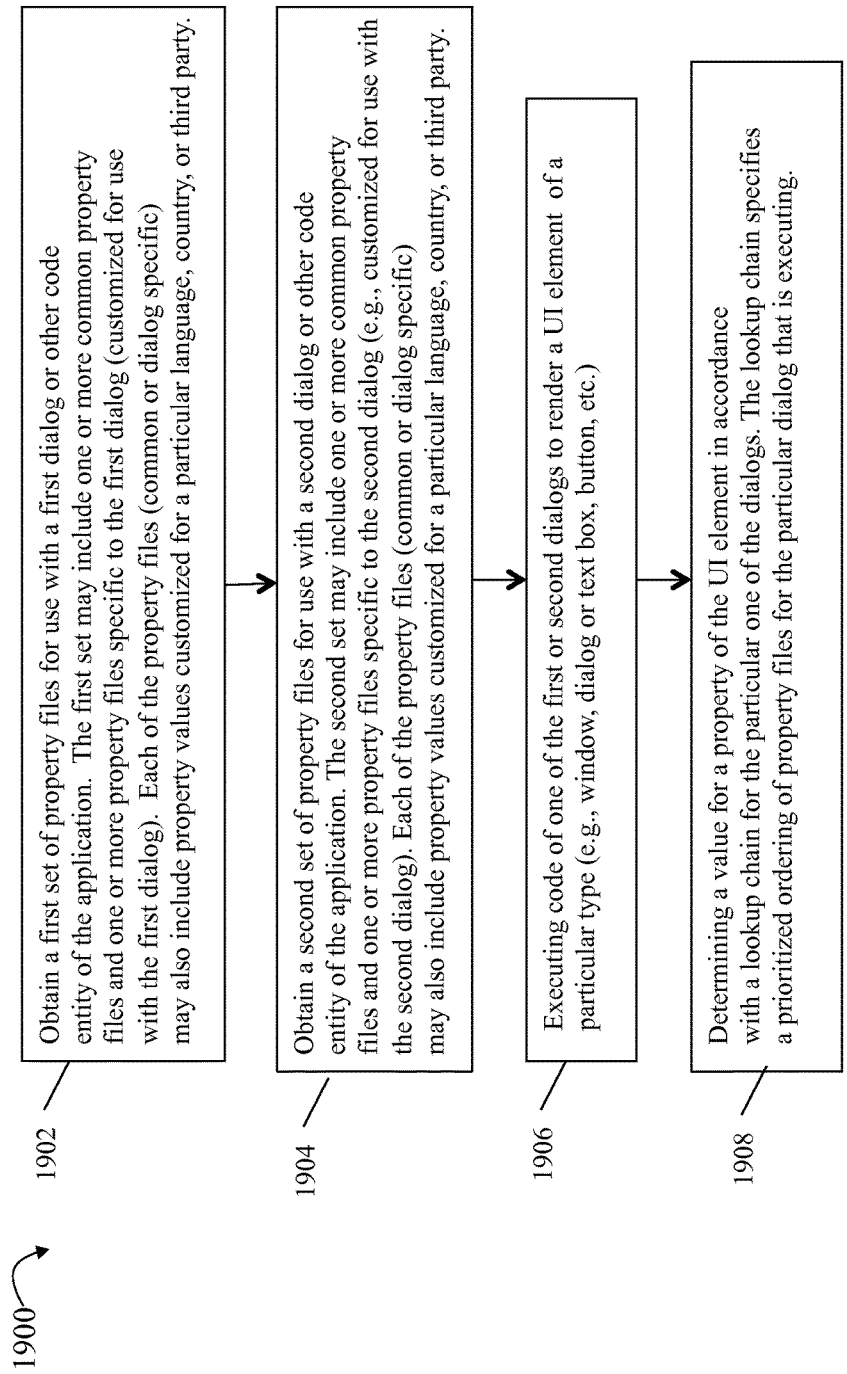
FIG. 21 is a flowchart of processing steps that may be performed in an embodiment in accordance with techniques herein.

Referring to FIG. 21, shown is a flowchart of processing steps that may be performed in an embodiment in accordance with techniques herein. The flowchart 1900 summarizes processing described above. In particular, the flowchart 1900 describes processing performed for two dialogs or other code entities of an application. More generally, the processing may be performed with respect to any number of dialogs or other code entities of an application. At step 1902, a first set of property files is obtained. The first set of property files are for use with a first dialog or other code entity of the application. The first set may include one or more common property files and one or more property files specific to the first dialog (customized for use with the first dialog). Each of the property files (common or dialog specific) of the first set may also include property values customized for a particular language, country, or third party. At step 1904, a second set of property files is obtained. The second set of property files are for use with a second dialog or other code entity of the application. The second set may include one or more common property files and one or more property files specific to the second dialog (customized for use with the second dialog). Each of the property files (common or dialog specific) of the second set may also include property values customized for a particular language, country, or third party. At step 1906, code of one of the first or second dialogs may be executed to render a UI element of a particular type, such as a window, dialog or text box, button, and the like. At step 1908, processing is performed to determine a value for a property of the UI element in accordance with a lookup chain for the particular one of the dialogs that is executing. As described herein, the lookup chain specifies a prioritized ordering of property files for the particular dialog that is executing. If the first dialog is executing, the lookup chain specifies a prioritized ordering, such as from highest to lowest, of the first set of property files. If the second dialog is executing, the lookup chain specifies a prioritized ordering, such as from highest to lowest, of the second set of property files. Step 1908 may be performed, for example, using the lookup service such as described in connection with FIG. 3.

The foregoing describes exemplary uses of techniques herein to specify the size of a particular type of UI element, such as the size of each window or box displayed for one or more wizards and/or dialogs. For example, a global default size value may be specified for all windows or dialog boxes used for all wizards and dialogs of an application, or for a particular wizard or dialog of an application. The global default size may be applicable for use with all wizards and/or dialogs for a given spoken language, country and/or OEM or other third party. The global size, such as included in a common property file applicable for a combination of language, country and/or OEM or third party, may be further customized for use with a particular one of the dialogs and wizards where the customized property value may be expressed as a relative percentage variation with respect to the global default value. For example, as illustrated herein, a value of 400 may be specified for a property size value whereby the global default value in a common property file may be expressed as 1.0*400 (e.g., 100%*400) and whereby a change in the size for a dialog (as in a dialog-specific property file) may be expressed as 1.5*400 (e.g., 150%*400). Also described herein, multiple property files, including one or more common property files and one or more customized property files may be specified for use with a particular code entity of an application, such as a particular dialog or wizard. Global or default size property values applicable to multiple dialogs and/or wizards may be included in a common property file where the common property file may specify property values applicable to all dialogs and wizards for a combination of one or more of: a particular language, country and/or third party. Dialog or wizard-specific property files may then be used to specify other property values which may be further customized for a particular dialog or wizard. A property value for a first property included in the dialog or wizard specific property file may be used to override a property value for the same first property included in a common property file. In this manner, a different prioritized lookup chain or ordering of the property files for the particular dialog or wizard may be used to determine a final value for a property (e.g., such as for a size dimension of the window displayed for the dialog or wizard) where multiple property files in the chain may specify different values for the same property.

In connection with the foregoing use of a common property file that specifies a default or global value of a property for a particular combination of factors including any of a particular spoken language, a particular country, and/or a particular OEM or third party, provided is technique by which the global default value may be easily and readily modified by simply specifying an updated value in the common property file. In this manner, the common property file may be used to specify a global value for a size property such as of a window of dialogs and/or wizards which effectively results in resizing all such windows for all wizards and dialogs using the common property file. For example, with reference back to FIG. 15, assuming that HEIGHT is used to specify a value of a height property of all windows rendered for a dialog, modifying the statement 1306*a* to specify "HEIGHT={0:math: *1.5}" results in the height of all windows for dialog1 and dialog2 being 50% larger as compared to the size denoted in FIG. 15.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media (also referred to as computer readable media) may include, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for displaying a user interface comprising:
providing a first plurality of property files specifying values for properties of user interface elements of the user interface of an application when executing a first code entity of the application, said first plurality of property files including a first property file and a common property file, wherein said common property file specifies a first value for a first property of a first type of user interface element, said common property file specifying default property values for user interface elements customized for a first combination of factors including a first language, a country and a third party, and wherein the first property file is a property file specifically for use with the first code entity and specifies property values for user interface elements customized for use with the first code entity related to the first combination of factors including the first language, the country and the third party;
determining whether the user interface of the application is displayed in connection with a second language;
responsive to determining the user interface is displayed in connection with the second language, specifying that the first plurality of property files further includes a second common property file specifying default property values for user interface elements customized for a second combination of factors including the second language; and
executing said first code entity of the application, wherein said executing said first code entity of the application includes performing first processing to render a first user interface element of the first type when displaying the user interface of the application, the first processing comprising:
determining a current value for the first property of the first user interface element for use with the first code entity in accordance with a first lookup chain specifying a prioritized ordering of the first plurality of property files, wherein the common property file has a lower priority than the first property file in the first lookup chain whereby any value for the first property in the common property file is overridden by a value for the first property in the first property file, wherein, when the user interface is displayed in the second language, the first lookup chain and the first plurality of files each includes the common property file with user interface customizations for the first language including at least one customized property value affecting a physical dimension of a displayed dialogue box for the first language and the second common property file with user interface customizations for the second language including at least one customized property value affecting a physical dimension of a displayed dialogue box for the second language, and the prioritized ordering indicates the current value for the first property is a default value included in the common property file when no other value for the first property is specified in any other property file of the first plurality of property files, wherein when displaying the user interface in connection with the first language, said second common property file is omitted from the first plurality of files and is omitted from the first lookup chain;
setting said first property of the first user interface element to the current value; and
rendering the first user interface element in accordance with the current value.

2. The method of claim 1, wherein the first lookup chain specifies a prioritized ordering of the first plurality of property files from highest to lowest priority, and the method further comprises:
determining a set of one or more of the first plurality of property files each specifying a value for the first property of the first type of user interface element; and
determining said current value for the first property of the first user interface element using the set of one or more of the first plurality of property files, wherein said current value is specified in a first of the property files in the set having the highest relative priority of all property files in the set in accordance with the first lookup chain.

3. The method of claim 2, wherein the first plurality of property files is processed in order from the highest to the lowest priority of the prioritized ordering of the first lookup chain.

4. The method of claim 1, wherein said first type of user interface element is any of a window, a menu, a menu bar, a menu item, a text box, a button, a navigation section including one or more hyperlinks, a hyperlink, a table, a drop-down list, a list box, a check box, a dialog box, a wizard, and a combo box.

5. The method of claim 1, wherein the first property of the first type of user interface element affects any of a text size, a numeric value denoting an intensity of a color, a numeric value denoting a mixture or shading of one or more colors, a physical dimension, a height, a width, and a location or placement of said first type of user interface element in connection with displaying the user interface.

6. The method of claim 1, wherein the first property file specifies a second value for the first property of the first type of user interface element, and wherein said determining a current value for the first property of the first user interface element for use with the first code entity in accordance with the first lookup chain determines said second value as said current value for the first property of the first user interface element when displaying the user interface in connection with the first language.

7. The method of claim 1, further comprising:
providing a second plurality of property files specifying values for properties of user interface elements of the user interface of the application when executing a second code entity of the application, said second plurality of property files including a second property file and the common property file.

8. The method of claim 7, wherein the first property file does not specify a value for the first property of the first type of user interface element and the common property file specifies said current value for the first property of the first type of user interface element, and wherein if the second property file also does not specify a value for the first property, subsequently modifying the current value in the common property file to an updated value results in the updated value being used when executing the first code entity and the second code entity subsequent to said modifying.

9. The method of claim 7, further comprising:
executing said second code entity of the application, wherein said executing said second code entity of the application includes performing second processing to render a second user interface element of the first type when displaying the user interface of the application, the second processing comprising:
determining a second current value for the first property of the second user interface element for use with the second code entity in accordance with a second lookup chain specifying a prioritized ordering of the second plurality of property files;
setting said first property of the second user interface element to the second current value; and
rendering the second user interface element in accordance with the second current value.

10. The method of claim 9, wherein the second lookup chain specifies a prioritized ordering of the second plurality of property files from highest to lowest priority, and the method further comprises:
determining a set of one or more of the second plurality of property files each specifying a value for the first property of the first type of user interface element; and
determining said second current value for the first property of the second user interface element using the set of one or more of the second plurality of property files, wherein said second current value is specified in a first of the property files in the set having the highest relative priority of all property files in the set in accordance with the second lookup chain.

11. The method of claim 10, wherein the second plurality of property files is processed in order from the highest to the lowest priority of the prioritized ordering of the second lookup chain.

12. The method of claim 11, wherein the second property file does not specify a value for the first property of the first type of user interface element and the common property file specifies said second current value for the first property of the first type of user interface element.

13. The method of claim 11, wherein the second property file specifies a particular value for the first property of the first type of user interface element, and wherein said determining said second current value for the first property of the second user interface element for use with the second code entity in accordance with the second lookup chain determines said particular value as said second current value for the first property of the second user interface element when displaying the user interface in connection with the first language.

14. The method of claim 7, wherein the second property file is a property file specifically for use with the second code entity and specifies property values for user interface elements customized for use with the second code entity related to the first combination of factors.

15. The method of claim 14, wherein the second common property file is included in both the first plurality of property files and the second plurality of property files.

16. The method of claim 1, wherein the common property file specifies a first size dimension for a parent user interface element and a second size dimension for a child user interface element of the parent user interface element, said second size dimension being determined relative to the first size dimension whereby a modification to the first size dimension results in automatically resizing the second size dimension relative to the modification to the first size dimension.

17. A non-transitory computer readable medium comprising code stored thereon that, when executed, performs a method for displaying a user interface comprising:
  providing a first plurality of property files specifying values for properties of user interface elements of the user interface of an application when executing a first code entity of the application, said first plurality of property files including a first property file and a common property file, wherein said common property file specifies a first value for a first property of a first type of user interface element, said common property file specifying default property values for user interface elements customized for a first combination of factors including a first language, a country and a third party, and wherein the first property file is a property file specifically for use with the first code entity and specifies property values for user interface elements customized for use with the first code entity related to the first combination of factors including the first language, the country and the third party;
  determining whether the user interface of the application is displayed in connection with a second language;
  responsive to determining the user interface is displayed in connection with the second language, specifying that the first plurality of property files further includes a second common property file specifying default property values for user interface elements customized for a second combination of factors including the second language; and
  executing said first code entity of the application, wherein said executing said first code entity of the application includes performing first processing to render a first user interface element of the first type when displaying the user interface of the application, the first processing comprising:
    determining a current value for the first property of the first user interface element for use with the first code entity in accordance with a first lookup chain specifying a prioritized ordering of the first plurality of property files, wherein the common property file has a lower priority than the first property file in the first lookup chain whereby any value for the first property in the common property file is overridden by a value for the first property in the first property file, wherein, when the user interface is displayed in the second language, the first lookup chain and the first plurality of files each includes the common property file with user interface customizations for the first language including at least one customized property value affecting a physical dimension of a displayed dialogue box for the first language and the second common property file with user interface customizations for the second language including at least one customized property value affecting a physical dimension of a displayed dialogue box for the second language, and the prioritized ordering indicates the current value for the first property is a default value included in the common property file when no other value for the first property is specified in any other property file of the first plurality of property files, wherein when displaying the user interface in connection with the first language, said second common property file is omitted from the first plurality of files and is omitted from the first lookup chain;
    setting said first property of the first user interface element to the current value; and
    rendering the first user interface element in accordance with the current value.

18. The non-transitory computer readable medium of claim 17, wherein the first lookup chain specifies a prioritized ordering of the first plurality of property files from highest to lowest priority, and the method further comprises:
  determining a set of one or more of the first plurality of property files each specifying a value for the first property of the first type of user interface element; and
  determining said current value for the first property of the first user interface element using the set of one or more of the first plurality of property files, wherein said current value is specified in a first of the property files in the set having the highest relative priority of all property files in the set in accordance with the first lookup chain.

19. The non-transitory computer readable medium of claim 18, wherein the first plurality of property files is processed in order from the highest to the lowest priority of the prioritized ordering of the first lookup chain and wherein said first type of user interface element is any of a window, a menu, a menu bar, a menu item, a text box, a button, a navigation section including one or more hyperlinks, a hyperlink, a table, a drop-down list, a list box, a check box, a dialog box, a wizard, and a combo box.

20. A system comprising:
  one or more processors; and
  a memory comprising code stored thereon that, when executed, performs a method for displaying a user interface comprising:
    providing a first plurality of property files specifying values for properties of user interface elements of the user interface of an application when executing a first code entity of the application, said first plurality of property files including a first property file and a common property file, wherein said common property file specifies a first value for a first property of a first type of user interface element, said common property file specifying default property values for user interface elements customized for a first combination of factors including a first language, a country and a third party, and wherein the first property file is a property file specifically for use with the first code entity and specifies property values for user interface elements customized for use with the first code entity related to the first combination of factors including the first language, the country and the third party;
    determining whether the user interface of the application is displayed in connection with a second language;
    responsive to determining the user interface is displayed in connection with the second language, specifying that the first plurality of property files further includes a second common property file specifying default property values for user interface elements customized for a second combination of factors including the second language; and
    executing said first code entity of the application, wherein said executing said first code entity of the application includes performing first processing to render a first user interface element of the first type when displaying the user interface of the application, the first processing comprising:
      determining a current value for the first property of the first user interface element for use with the first code entity in accordance with a first lookup chain specifying a prioritized ordering of the first plurality of property files, wherein the common property file has a lower priority than the first property file in the first lookup chain whereby any value for the first property in the common property file is overridden by a value for the first property in the first property file, wherein, when the user interface is displayed in the second language, the first lookup chain and the first plurality of files each includes the common property file with user interface customizations for the first language including at least one customized property value affecting a physical dimension of a displayed dialogue box for the first language and the second common property file with user interface customizations for the second language including at least one customized property value affecting a physical dimension of a displayed dialogue box for the second language, and the prioritized ordering indicates the current value for the first property is a default value included in the common property file when no other value for the first property is specified in any other property file of the first plurality of property files, wherein when displaying the user interface in connection with the first language, said second common property file is omitted from the first plurality of files and is omitted from the first lookup chain;

setting said first property of the first user interface element to the current value; and rendering the first user interface element in accordance with the current value.

\* \* \* \* \*